(12) United States Patent
Nishida

(10) Patent No.: US 6,428,730 B1
(45) Date of Patent: Aug. 6, 2002

(54) METHOD FOR MANUFACTURING SYNTHETIC RESIN-MADE HOLLOW MEMBER WITH INTERMEDIATE ELEMENT INCORPORATED THEREIN, AND APPARATUS THEREFOR

(75) Inventor: Michinori Nishida, Hiroshima (JP)

(73) Assignee: GP Daikyo Corporation, Hiroshima (JP)

( * ) Notice: Subject to any disclaimer, the term of this patent is extended or adjusted under 35 U.S.C. 154(b) by 0 days.

(21) Appl. No.: 09/434,369

(22) Filed: Nov. 5, 1999

(30) Foreign Application Priority Data

Nov. 13, 1998 (JP) .............................. 10-323461

(51) Int. Cl.⁷ ...................... B29C 45/14; B29C 45/04; B29C 45/10; B29C 45/42
(52) U.S. Cl. ................. 264/255; 264/263; 264/267; 264/275; 264/297.7; 264/297.8; 425/121; 425/123; 425/134; 425/438; 425/444
(58) Field of Search ................. 264/255, 259, 264/261, 263, 271.1, 275, 297.2, 297.7, 297.8, 267, 328.7, 328.8, 328.11; 425/444, 438, 116, 121, 123, 125, 576, 134

(56) References Cited

U.S. PATENT DOCUMENTS

| | | | | |
|---|---|---|---|---|
| 3,287,485 A | * | 11/1966 | McCord | 264/263 |
| 4,155,478 A | * | 5/1979 | Ogi | 264/263 |
| 4,261,947 A | * | 4/1981 | Ogi | 264/263 |
| 5,030,406 A | * | 7/1991 | Sorensen | 264/255 |
| 5,116,557 A | * | 5/1992 | Debaes et al. | 263/255 |
| 5,756,029 A | * | 5/1998 | Nakamichi et al. | 264/250 |
| 5,885,691 A | * | 3/1999 | Breezer et al. | 264/261 |
| 6,036,908 A | * | 3/2000 | Nishida et al. | 264/297.3 |
| 6,042,364 A | * | 3/2000 | Nishida | 264/255 |
| 6,086,808 A | * | 7/2000 | Sorensen et al. | 264/250 |
| 6,210,619 B1 | * | 4/2001 | Owens | 264/297.2 |

FOREIGN PATENT DOCUMENTS

| | | |
|---|---|---|
| DE | 199 25 435 A1 | 12/1999 |
| JP | 07217755 | 8/1995 |
| JP | 09076288 | 3/1997 |

* cited by examiner

Primary Examiner—Angela Ortiz
(74) Attorney, Agent, or Firm—Foley & Lardner

(57) ABSTRACT

For molding a synthetic resin-made hollow member with an intermediate element incorporated therein, the invention provides method and apparatus improved in assemblability, assembly precision and productivity. The molding apparatus for slide type injection molding includes: a stationary molding die having first and second hollow-member use stationary die portions and a stationary-side intermediate-element use die portion; a movable molding die having first and second hollow-member use slidable die portions and a movable-side intermediate-element use die portion; and intermediate-element moving mechanism for moving an intermediate element Wf longitudinally, wherein the stationary and movable molding dies are openable and closable to each other and the first and second hollow-member use slidable die portions are slidable longitudinally relative to the first and second hollow-member use stationary die portions, respectively, while the movable-side intermediate-element use die portion is non-slidable. By using this molding apparatus, a hollow member in which the first and second half bodies have been joined to each other with an intermediate element previously incorporated between the half bodies is obtained at each one-time opening and closing operation of the stationary molding die and the movable molding die.

4 Claims, 16 Drawing Sheets

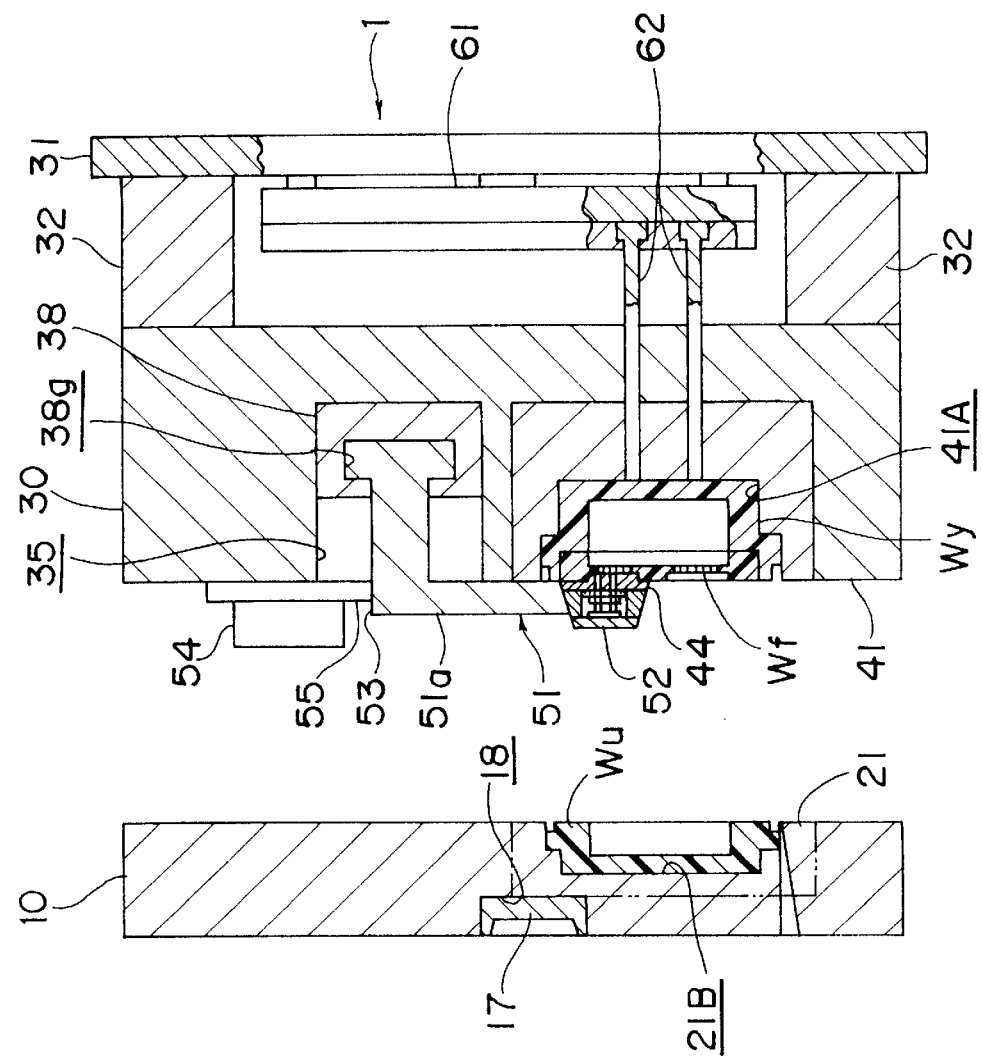
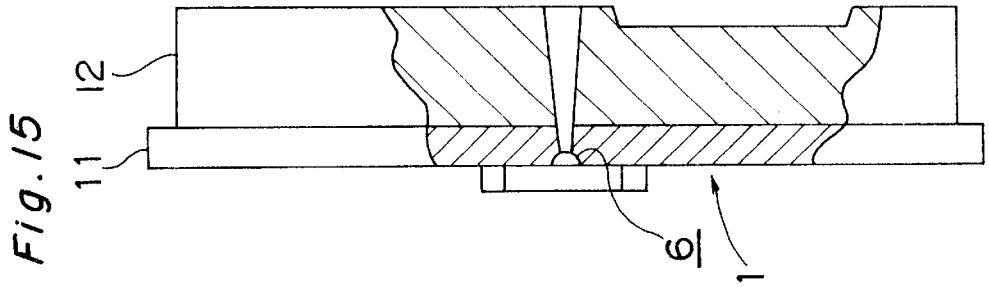
Fig. 15

METHOD FOR MANUFACTURING SYNTHETIC RESIN-MADE HOLLOW MEMBER WITH INTERMEDIATE ELEMENT INCORPORATED THEREIN, AND APPARATUS THEREFOR

BACKGROUND OF THE INVENTION

The present invention relates to a method for manufacturing a synthetic resin-made hollow member with an intermediate element incorporated therein, as well as an apparatus therefor, through the steps of previously incorporating the intermediate element such as a filter to between a pair of synthetic resin-made half bodies, and then bringing the two half bodies into abutment against each other and joining the two half bodies together at the abutted portion.

As the method for manufacturing a synthetic resin-made hollow member, there has conventionally been known, for example as shown in Japanese Patent Laid-Open Publication HEI 7-217755, a method employing a slide type injection molding technique (what is called die slide injection (DSI) molding). In this method, a pair of molding dies are provided, one molding die having one set of male molding portion and female molding portion for molding half bodies, and the other molding die having female molding portion and male molding portion opposed to those molding portions, where the one molding die is slidable relative to the other molding die in the direction in which the molding portions are arrayed. In this arrangement, after half bodies are simultaneously molded (primary injection), one molding die (slidable die) is slid relative to the other molding die (stationary die) so that the two half bodies left in the individual female molding portions are brought into abutment against each other, and then with the dies closed, molten resin is injected to peripheries of the abutted portion (secondary injection) so that the two half bodies are joined together.

This method employing the DSI technique is capable of enhancing the productivity to a great extent, as compared with the prior art in which the molding of half bodies and the abutment and joint of the half bodies would be done in separate processes. Still, the joint strength and the sealability of the abutted portion can be secured more stably than conventional cases in which half bodies would be joined together by bonding or thermal fusion processes.

It is to be noted that, in manufacturing a synthetic resin-made hollow member, the terms "primary injection (molding)" herein refer to an injection (molding) step in which half bodies to form a hollow member (molded article) are molded by injecting molten resin (primary resin) into a cavity defined by closing molding dies together. Also, the terms "secondary injection" refer to an injection step in which a pair of half bodies obtained by the primary injection (molding) step are joined together by bringing the pair of half bodies into abutment against each other and then injecting molten resin (secondary resin) to generally peripheries of the abutted portion.

Also for the manufacture of a synthetic resin-made hollow member with an intermediate element such as a filter incorporated inside, a high efficiency production using the DSI technique can be achieved, as disclosed in the aforementioned prior art publication, by performing the primary injection, then with the dies once opened, assembling a separately fabricated intermediate element to either one of half bodies, and thereafter, through die sliding and die closure processes, performing the secondary injection.

In this connection, in the DSI method, the position of the slidable die relative to the stationary die in the sliding direction naturally differs between before and after the sliding operation of the molding die (in other words, between primary injection and secondary injection). Therefore, particularly in the case of a multiple(e.g., 2)-yield molding apparatus capable of yielding a multiplicity (2) of molded articles simultaneously, the stationary die and the slidable die are both longer in length, so that a large eccentric load acts upon one or the other die closure, which makes the apparatus more prone to failures and the die-closing device more prone to eccentric wear. As a result, there has been a disadvantage of the method that the molding apparatus may incur shorter life or deterioration of the precision of molded articles.

In view of such problems, for example, Japanese Patent Laid-Open Publication HEI 9-76288 has proposed a so-called double DSI method in which sets of male molding portion and female molding portion as described above are provided in the stationary die in series in the die sliding direction, while slidable dies that operate independently of each other are provided in correspondence to the individual sets of molding portions.

According to this series type double DSI method, it becomes possible to make a uniform tightening load act upon the die closure, and besides since two slidable dies are provided separately from each other, the sliding amount of each slidable die can be made shorter, as compared with conventional counterpart (having one slidable die), so that the space can be saved.

When a synthetic resin-made hollow member with an intermediate element incorporated therein, such as a strainer with a filter incorporated therein, is manufactured by the DSI method, it has been conventional practice that after primary injection and before secondary injection, a separately fabricated intermediate element is assembled into either one of half bodies. In this case, however, there is a need of providing a step for manufacturing the intermediate element utterly separately from the steps for performing the molding and the abutting and joining of the half bodies, as well as a need of separately managing the intermediate element manufactured in this way as a part, which makes this method disadvantageous in cutting the manufacturing cost. Further, since the half bodies molded by the primary injection and the intermediate element manufactured separately are different in molding conditions as well as temperature and other conditions in the assembly, this method is disadvantageous also in attaining improvements in assemblability and assembly precision.

Also, when the intermediate element manufactured separately as described above is set to the half bodies, it would be conceived to provide an automatic assembler such as a robot outside the molding machine so that the intermediate-element incorporating step is automatized by assembling the intermediate element to the half bodies with this automatic assembler. For example, it is also possible to provide a holder (chuck) for clamping the intermediate element in a product takeout device (takeout robot) provided for use of taking products out of the injection molding machine, so that the intermediate element is clamped and traveled by this holder so as to be set to either one of the half bodies.

With the use of such an automatic assembler, in order to enhance the productivity by reducing the cycle time of production and to ensure a successful assembly precision, it is preferable that the distance for the intermediate element to be traveled is as short as possible.

SUMMARY OF THE INVENTION

Therefore, an object of the present invention is to provide a method, as well as an apparatus therefor, for manufacturing a synthetic resin-made hollow member with an intermediate element incorporated therein, the method being capable of molding hollow half bodies and an intermediate element and assembling them with the same dies, and yet the method involving a shorter travel of the intermediate element.

To achieve this object, in one aspect of the present invention, there is provided a method for manufacturing a synthetic resin-made hollow member with an intermediate element incorporated therein by, with the intermediate element placed between a pair of synthetic resin-made half bodies, bringing the half bodies into abutment against each other and joining the half bodies together at this abutted portion, the method comprising:

with use of a molding apparatus for slide type injection molding, the molding apparatus comprising: a stationary molding die having first and second hollow-member use stationary die portions in each of which a male molding portion and a female molding portion spaced from each other at a specified spacing are arrayed longitudinally, and a stationary-side intermediate-element use die portion placed between the two hollow-member use stationary die portions and having an intermediate-element molding portion; a movable molding die having first and second hollow-member use slidable die portions in each of which a male molding portion and a female molding portion spaced from each other at a specified spacing are arrayed longitudinally in an order reverse to that of the hollow-member use stationary die portions, and a movable-side intermediate-element use die portion placed between the two hollow-member use slidable die portions and having an intermediate-element molding portion; and intermediate-element moving mechanism, which has a moving arm driven by a motor, for moving an intermediate element molded by a combination of the stationary-side and movable-side intermediate-element use molding portions longitudinally up to a specified position, wherein the stationary and movable molding dies are openable and closable to each other and the first and second hollow-member use slidable die portions are slidable longitudinally at specified pitches, respectively, relative to the first and second hollow-member use stationary die portions, respectively, while the movable-side intermediate-element use die portion is non-slidable relative to the stationary-side intermediate-element use die portion, a die closure step for performing die closure by closing the stationary molding die and the movable molding die to each other;

an injection step for, after the die closure step, injecting molten resin into a molding cavity defined by the two molding dies so that first and second half bodies for a current cycle are molded by combinations of the male molding portions and the female molding portions and that an intermediate element for the current cycle is molded by a combination of the intermediate-element molding portions, and further joining the first and second half bodies of a preceding cycle by injecting molten resin to an abutted portion between the first and second half bodies by a combination of the female molding portions;

a takeout step for, after the injection step, taking out a hollow member, in which the half bodies of the preceding cycle have been joined to each other with the intermediate element of the preceding cycle previously incorporated therein, while opening the molding dies;

an intermediate-element assembly step for assembling the intermediate element for the current cycle to either one of the first and second half bodies for the current cycle by driving the intermediate-element moving mechanism and thereby moving the intermediate element; and a sliding step for sliding the first and second hollow-member use slidable die portions to specified pitches, respectively, longitudinally in a direction reverse to that of the preceding cycle, these steps being iteratively performed, whereby a hollow member in which the first and second half bodies have been joined to each other with the intermediate element previously incorporated between the two half bodies is obtained at each one-time opening and closing operation of the stationary molding die and the movable molding die.

In another aspect of the present invention, there is provided an apparatus for manufacturing a synthetic resin-made hollow member with an intermediate element incorporated therein by, with the intermediate element placed between a pair of synthetic resin-made half bodies, bringing the half bodies into abutment against each other and joining the half bodies together at this abutted portion, the apparatus comprising:

first and second hollow-member use stationary die portions in each of which a male molding portion and a female molding portion spaced from each other at a specified spacing are arrayed longitudinally;

a stationary-side intermediate-element use die portion placed between the two hollow-member use stationary die portions and having an intermediate-element molding portion;

first and second hollow-member use slidable die portions in each of which a male molding portion and a female molding portion spaced from each other at a specified spacing are arrayed longitudinally in an order reverse to that of the hollow-member use stationary die portions;

a movable-side intermediate-element use die portion placed between the two hollow-member use slidable die portions and having an intermediate-element molding portion;

opening and closing hydraulic mechanism for opening and closing a movable molding die having the first and second hollow-member use slidable die portions and the movable-side intermediate-element use die portion, relative to a stationary molding die having the first and second hollow-member use stationary die portions and the stationary-side intermediate-element use die portion;

sliding mechanism which has driving cylinders for, while holding the movable-side intermediate-element use die portion non-slidable, sliding the two hollow-member use slidable die portions longitudinally at specified pitches, respectively, relative to their corresponding hollow-member use stationary die portions;

intermediate-element moving mechanism, which has a moving arm driven by a motor, for moving an intermediate element molded by a combination of the stationary-side and movable-side intermediate-element use molding portions longitudinally up to a specified position; and injection mechanism, which has a injection molding machine, for injecting molten resin into a molding cavity defined by closing the stationary molding die and the movable molding die to each other;

wherein the apparatus performs an injection molding process in which for each one-time opening and closing operation of the stationary molding die and the movable molding die, the hollow-member use slidable die portions slide at specified pitches, respectively, relative to their corresponding hollow-member use stationary die portions while the intermediate-element moving mechanism moves the molded intermediate element to a specified position, so that first and second half bodies for a current cycle are molded by combinations between male molding portions and female molding portions of the first hollow-member use stationary die portion and the first hollow-member use slidable die portion, and that an intermediate element for the current cycle is molded by a combination of the intermediate-element molding portions of the stationary-side and movable-side intermediate-element use die portions, and further that the first and second half bodies of the preceding cycle are joined together by injecting molten resin into an abutted portion between the first and second half bodies by a combination between the female molding portions of the second hollow-member use stationary die portion and the second hollow-member use slidable die portion, whereby a hollow member in which the first and second half bodies have been joined to each other with the intermediate element previously incorporated between the half bodies is obtained at each one-time opening and closing operation of the stationary molding die and the movable molding die.

In the above mentioned aspects of the present invention, it is preferable that an initial position of the intermediate-element moving mechanism for moving the intermediate element is set to the stationary-side or movable-side intermediate-element use die portion.

According to the present invention, at each one-time opening and closing operation of the stationary molding die and the movable molding die, a hollow member in which first and second half bodies have been joined to each other with an intermediate element previously incorporated between the two half bodies can be obtained.

In this case, since the step of fabricating the intermediate element can be performed as a sequence of steps together with the molding step and abutting and joining step of the half bodies, it is no longer necessary to separately manage the intermediate element as a component part as would be done in the prior art. Further, since the intermediate element and the half bodies are generally similar in molding conditions and assembling temperature condition to each other, it becomes possible to improve the assemblability and the assembly precision.

Also, by virtue of the provision of the intermediate-element moving mechanism for moving the molded intermediate element longitudinally up to a specified position, the intermediate element can be automatically assembled to a half body, allowing not only the improvement in assembly precision but also saving of labor and improvement in production efficiency to be achieved.

Further, by virtue of the provision of the intermediate-element moving mechanism in the molding die, the travel of the intermediate element can be shortened, as compared with the case where an automatic assembler provided outside the molding apparatus is used, so that the assembly precision of the intermediate element to the half body can be even further enhanced and besides that the production cycle time can be further reduced.

Still further, according to the present invention, since the initial position of the intermediate-element moving mechanism for moving the intermediate element is preferably set to an intermediate-element use die portion on the stationary side or the movable side, the travel of the intermediate-element moving mechanism required to move the intermediate element can be even further shortened so that the assembly precision can be even more improved and that the production cycle time can be even further reduced.

BRIEF DESCRIPTION OF THE DRAWINGS

FIG. 15 is an explanatory view in transverse cross section of the molding apparatus taken along a line Y15—Y15 of FIG. 7;

DETAILED DESCRIPTION OF THE PREFERRED EMBODIMENTS

Hereinbelow, embodiments of the present invention are described with reference to the accompanying drawings on a case where the invention is applied to the manufacture of a strainer having a synthetic resin-made filter provided therein.

Figure 1:
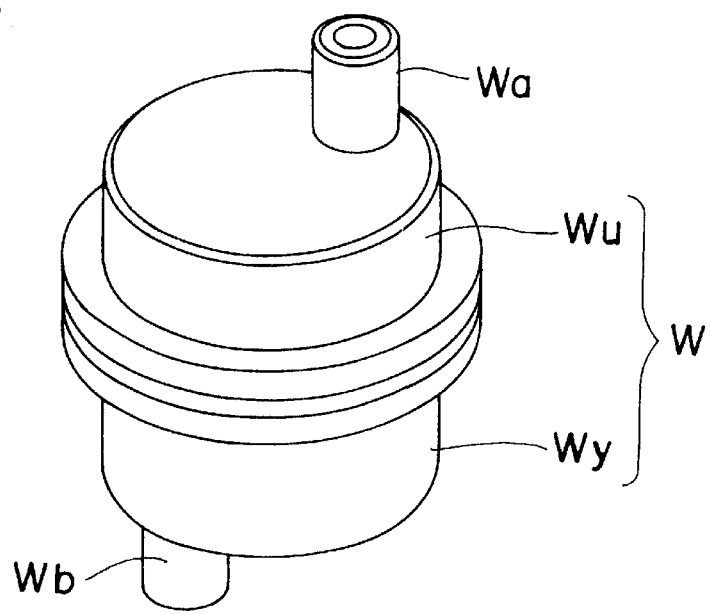
FIG. 1 is a perspective view of an oil strainer according to an embodiment of the present invention.
Figure 2:
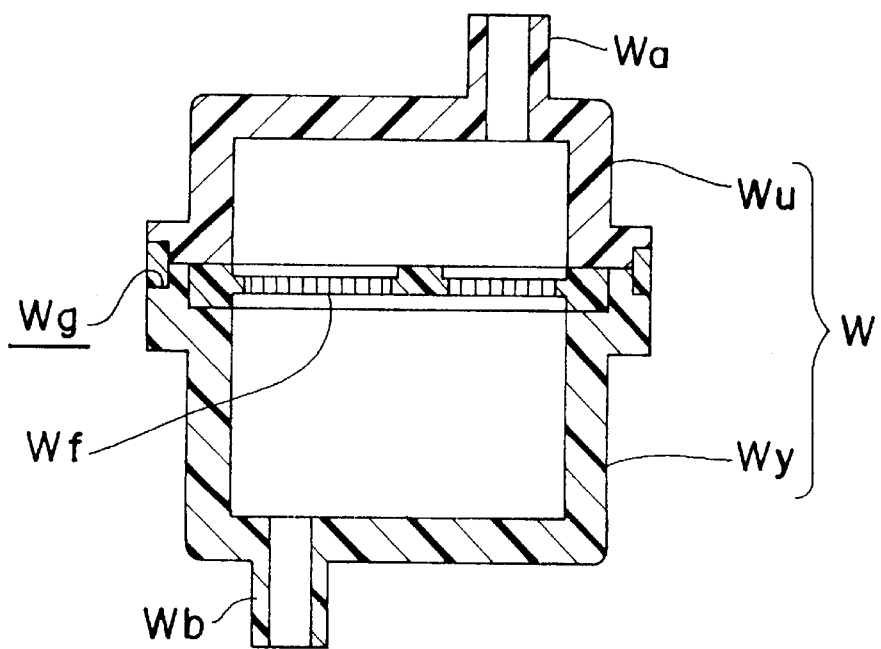
FIG. 2 is an explanatory view in longitudinal cross section of the oil strainer.

FIGS. 1 and 2 show an oil strainer W (hereinafter, referred to as work or molded article as appropriate) as a synthetic resin-made hollow member according to this embodiment. This oil strainer W is formed into a hollow shape by a combination of an upper half Wu having a connecting tube Wa and a lower half Wy having a connecting tube Wb, where a synthetic resin-made filter Wf is incorporated inside (between the two halves Wu, Wy).

This oil strainer W, as described in detail later, is obtained as a hollow member W (oil strainer) with the filter Wf as an intermediate element incorporated therein, with the use of the so-called die slide injection (DSI) method, by molding the upper and lower halves Wu, Wy and the filter Wf with one molding apparatus (primary injection molding), and by, with the filter Wf assembled to either one of the halves Wu, Wy, bringing the halves Wu, Wy into abutment against each other and further joining them together within the molding dies (secondary injection).

Also, as can be well understood from FIG. 2, in the oil strainer W, a groove portion Wg having a U-shaped cross section and preferably defined by wall portions of the halves Wu, Wy is provided, more preferably, along the outer periphery of the abutting surface of the halves Wu, Wy. Before the secondary injection, the opening is closed by die surfaces of the molding dies so that a resin passage having a closed cross section is formed.

That is, after the upper and lower halves Wu, Wy are brought into abutment against each other within the molding dies, resin (secondary resin) for joining the halves with each other is injected and charged into the resin passage (secondary injection).

Next, the manufacturing (molding) method of the oil strainer W as well as the construction of a molding apparatus for the so-called die slide injection (DSI) to be used for this molding are explained.

Figure 3:
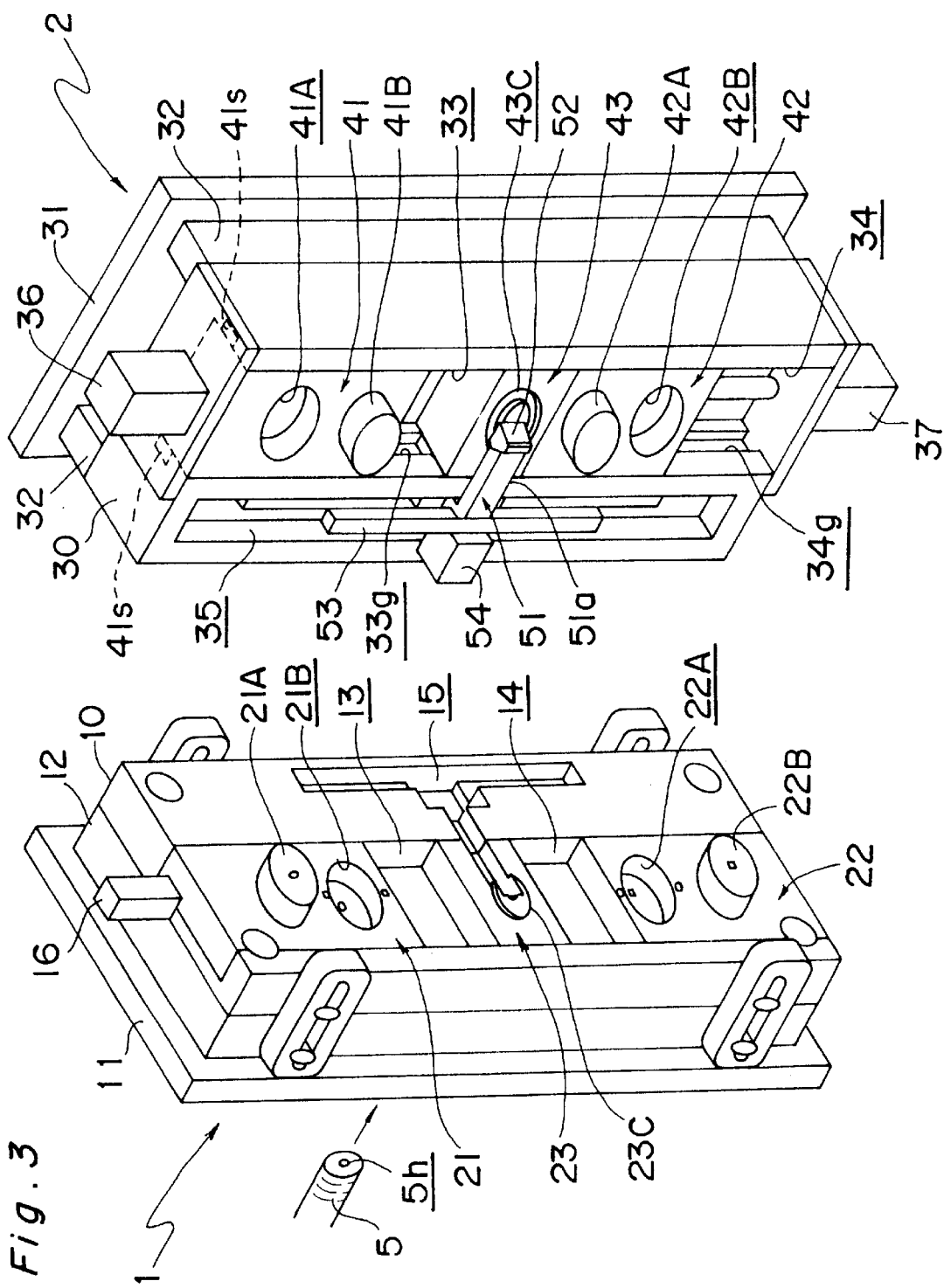
FIG. 3 is a perspective view showing a stationary die and a movable die according to the embodiment.

FIG. 3 is a perspective view for explaining the die surfaces of molding dies of this molding apparatus. As shown in this figure, the molding apparatus according to this embodiment comprises a stationary die 1 to which an injection head 5 of a molding machine is to be coupled, and a movable die 2 which performs opening and closing operation as well as sliding operation along the longitudinal direction relative to the stationary die 1.

These stationary die 1 and movable die 2 correspond to a stationary molding die and a movable molding die, respectively, as defined in claims for the present invention. Also, although the movable die 2 and the stationary die 1 are depicted as arranged along the horizontal (left-and-right) direction in FIG. 3, yet the arrangement of the two dies 2, 1, as actually mounted to the molding machine (not shown), is not limited to the horizontal (left-and-right) one and the dies 2, 1 may be used, for example, in an arrangement in which they are opposed to each other in the vertical or up-and-down direction.

The stationary die 1 comprises a die plate 10 in which later-described two (first and second) hollow-member use stationary die portions 21, 22 and an intermediate-element use stationary die portion 23 are provided on a front surface (die matching surface) side, a base plate 11 arranged parallel to the die plate 10, an intermediate support plate 12 fixed on a front surface side (a side facing the die plate 10) of the base plate 11 and located between the base plate 11 and the die plate 10, and a sprue bushing (not shown) fixed at a central portion of the intermediate support plate 12 and the base plate 11, where the injection head 5 of the molding machine is fixed to this sprue bushing.

Below the first hollow-member use stationary die portion 21 of the stationary die plate 10 and above the second hollow-member use stationary die portion 22, are provided a first recessed portion 13 and a second recessed portion 14 which are rectangular shaped as viewed from the front. Besides, a third recessed portion 15 having a generally T-shape as viewed from the front is formed beside the intermediate-element use stationary die portion 23.

Also, although not specifically shown in FIG. 3, a recessed groove portion (denoted by numeral 18 in later-described FIGS. 12 to 16) extending vertically is formed on a rear surface side (a side facing the intermediate support plate 12) of the die plate 10. In this recessed groove portion 18, as described later, is provided a switching block (denoted by numeral 17 in FIGS. 9 to 17) for switching over the resin passage leading to a molding portion of the die plate 10. This switching block 17 is driven vertically along the recessed groove portion 18 by actuating a cylinder device 16 provided at an upper end of the die plate 10. This block-driving cylinder 16 is connected to a control panel (not shown) of the molding apparatus so as to be capable of signal transmission and reception therewith, and is controlled for its drive in response to a control signal derived from the control panel.

Meanwhile, the movable die 2 comprises a die plate 30 in which later-described two (first and second) hollow-member use slidable die portions 41, 42 and an intermediate-element use movable die portion 43 are provided on a front surface (die matching surface) side, a base plate 31 arranged parallel to the die plate 30, and a pair of intermediate support members 32 arranged between the base plate 31 and the die plate 30 and extending vertically.

In the die plate 30 are provided a pair of rectangular-parallelopiped first and second recessed portions 33, 34 partitioned by the intermediate-element use movable die portion 43, and a third recessed portion 35 extending vertically up to near end portions of the die plate 30 beside these first and second recessed portions.

In side walls of the first and second recessed portions 33, 34 are provided a left-and-right pair of vertically extending guide grooves 33g, 34g (each only partly shown in FIG. 3), respectively, while in side surfaces of the first and second hollow-member use slidable die portions 41, 42 are provided a pair of slider portions (only a slider portion 41s of the first hollow-member use slidable die portion 41 is shown in FIG. 3) vertically slidably fitted to the guide grooves 33g, 34g, respectively.

Then, on top and bottom of the movable die plate 30 are fixed cylinder devices 36, 37 (first and second slidable-die-portion driving cylinders) for vertically driving the first, second hollow-member use slidable die portions 41, 42, respectively. By actuating these slidable-die-portion driving cylinders 36, 37, while the slider portions are guided by the guide grooves 33g, 34g, the first, second hollow-member use slidable die portions 41, 42 are slid longitudinally (vertically in this embodiment) to specified extents relative to the base plate 31, respectively.

In the third recessed portion 35 of the movable die plate 30 is placed a base portion (denoted by numeral 51b in FIGS. 11 to 15) of a moving arm 51 as an intermediate-element moving mechanism for moving the filter Wf as a molded intermediate element up to a specified position along the longitudinal direction (vertical direction) of the movable die plate 30. Also, a holder portion 52 for clamping the filter Wf is provided at a front end of an arm portion 51a of this moving arm 51, while a vertically extending rack 53 is fitted on the rear surface side of the base end portion of the arm portion 51a.

Further, a servo motor 54 for driving the moving arm 51 is set near a side portion of the third recessed portion 35 of the die plate 30, and a pinion gear(denoted by numeral 55 in FIGS. 11 to 15) to engage with the rack 53 is fixed at an output shaft (not shown) of the servo motor 54.

Then, by this servo motor 54 being driven, the pinion 55 is rotated, causing the moving arm 51 to vertically move along the third recessed portion 35 via the rack 53.

In addition, for die closure, the moving arm 51 is returned to an approximately center (initial position) in the longitudinal direction (vertical direction) of the movable die plate 30. While the stationary die 1 and the movable die 2 are closed together, the arm portion 51a, the rack 53 and the servo motor 54 are accommodated within the third recessed portion 15 provided in the stationary die plate 10.

The first, second slidable-die-portion driving cylinders 36, 37 and the servo motor 54 are connected to the control panel (not shown) of the molding apparatus so as to be capable of signal transmission and reception therewith, and are controlled for their drive, independently of each other, in response to a control signal derived from the control panel. The servo motor 54 for driving the moving arm 51 is actuated at specified timing also in response to a control signal derived from the control panel.

Also, the base plate 31 of the movable die 2 is coupled to, for example, hydraulic driving means (not shown). This driving means is connected to the control panel of the molding apparatus so as to be capable of signal transmission and reception therewith, thus enabled to open and close the movable die 2 at specified timing in response to a control signal from the control panel while the movable die 2 is maintained parallel to the stationary die 1.

In the die plate 10 of the stationary die 1, the aforementioned three die portions 21, 22 and 23 are arrayed in a vertically descending order of the first hollow-member use stationary die portion 21, the intermediate-element use stationary die portion 23 and the second hollow-member use stationary die portion 22.

In the die matching surface of the first hollow-member use stationary die portion 21, a male molding portion 21A formed into a projecting shape and a female molding portion 21B formed into a recessed shape are arrayed vertically (i.e., longitudinally of the stationary die plate 10) at a specified spacing. In the die matching surface of the second hollow-member use stationary die portion 22, a female molding portion 22A formed into a recessed shape and a male molding portion 22B formed into a projecting shape are arrayed vertically at a specified spacing.

These molding portions 21A, 21B and 22A, 22B of the hollow-member use stationary die portions 21 and 22 are molding portions for molding an upper or lower half Wu or Wy of the oil strainer W, or for obtaining a finished product W by joining these halves Wu, Wy to each other.

Also, in the die matching surface of the intermediate-element use stationary die portion 23 placed between these two hollow-member use stationary die portions 21 and 22, is provided a single male molding portion 23C having a shape close to a semicircular pillar shape and formed by cutting out part of a relatively low circular pillar (i.e., the male molding portion is relatively low, generally semicircular pillar shaped). This molding portion 23C is for molding the intermediate element Wf. In addition, the resultant cut-out portion except the male intermediate-element molding portion 23C is formed into a recessed shape, adjoining to the third recessed portion 15.

Meanwhile, in the die plate 30 of the movable die 2, the aforementioned three die portions 41, 42 and 43 are arrayed in a vertically descending order of the first hollow-member use slidable die portion 41, the intermediate-element use movable die portion 43 and the second hollow-member use slidable die portion 42.

In a die matching surface of the first hollow-member use slidable die portion 41, a recessed female molding portion 41A and a projecting male molding portion 41B are arrayed vertically in an order reverse to that of the first hollow-member use stationary die portion 21 at the same specified spacing as on the stationary die portion 21 side. In a die matching surface of the second hollow-member use slidable die portion 42, a projecting male molding portion 42A and a recessed female molding portion 42B are arrayed vertically in an order reverse to that of the second hollow-member use stationary die portion 22 at the same specified spacing as on the stationary die portion 22 side.

Also, in the die matching surface of the intermediate-element use movable die portion 43 placed between those two hollow-member use slidable die portions 41, 42, a relatively shallow single female molding portion 43C for molding intermediate-element use is provided.

As described above, the spacing between the molding portions 41A, 41B of the first hollow-member use slidable die portion 41 is set equal to the spacing between the molding portions 21A, 21B of the first hollow-member use stationary die portion 21, where this spacing is so set as to be equal to the vertical sliding extent of the first hollow-member use slidable die portion 41 relative to the die plate 30 (i.e., relative to the first hollow-member use stationary die portion 21).

Also, the spacing between the molding portions 42A, 42B of the second hollow-member use slidable die portion 42 is set equal to the spacing between the molding portions 22A, 22B of the second hollow-member use stationary die portion 22, where this spacing is so set as to be equal to the vertical sliding extent of the second hollow-member use slidable die portion 42 relative to the die plate 30 (i.e., relative to the second hollow-member use stationary die portion 22), like above.

In addition, the intermediate-element use movable die portion 43 placed between these two hollow-member use slidable die portions 41, 42 is provided integrally with the movable die plate 30 (i.e., stationary relative to the movable die plate 30).

Figure 4:
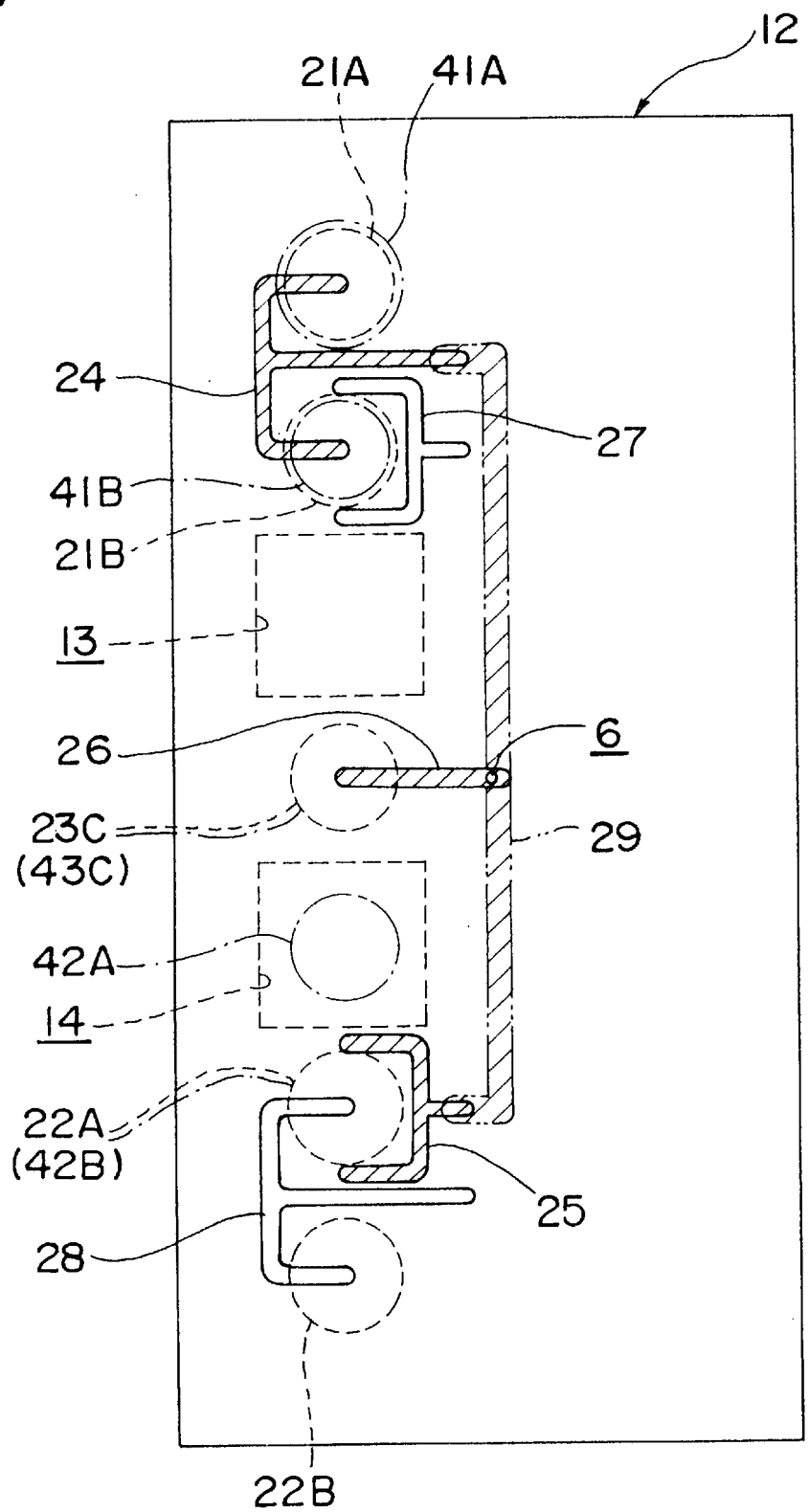
FIG. 4 is a front explanatory view of an intermediate support plate of the stationary die for showing resin passages in the first injection step.
Figure 5:
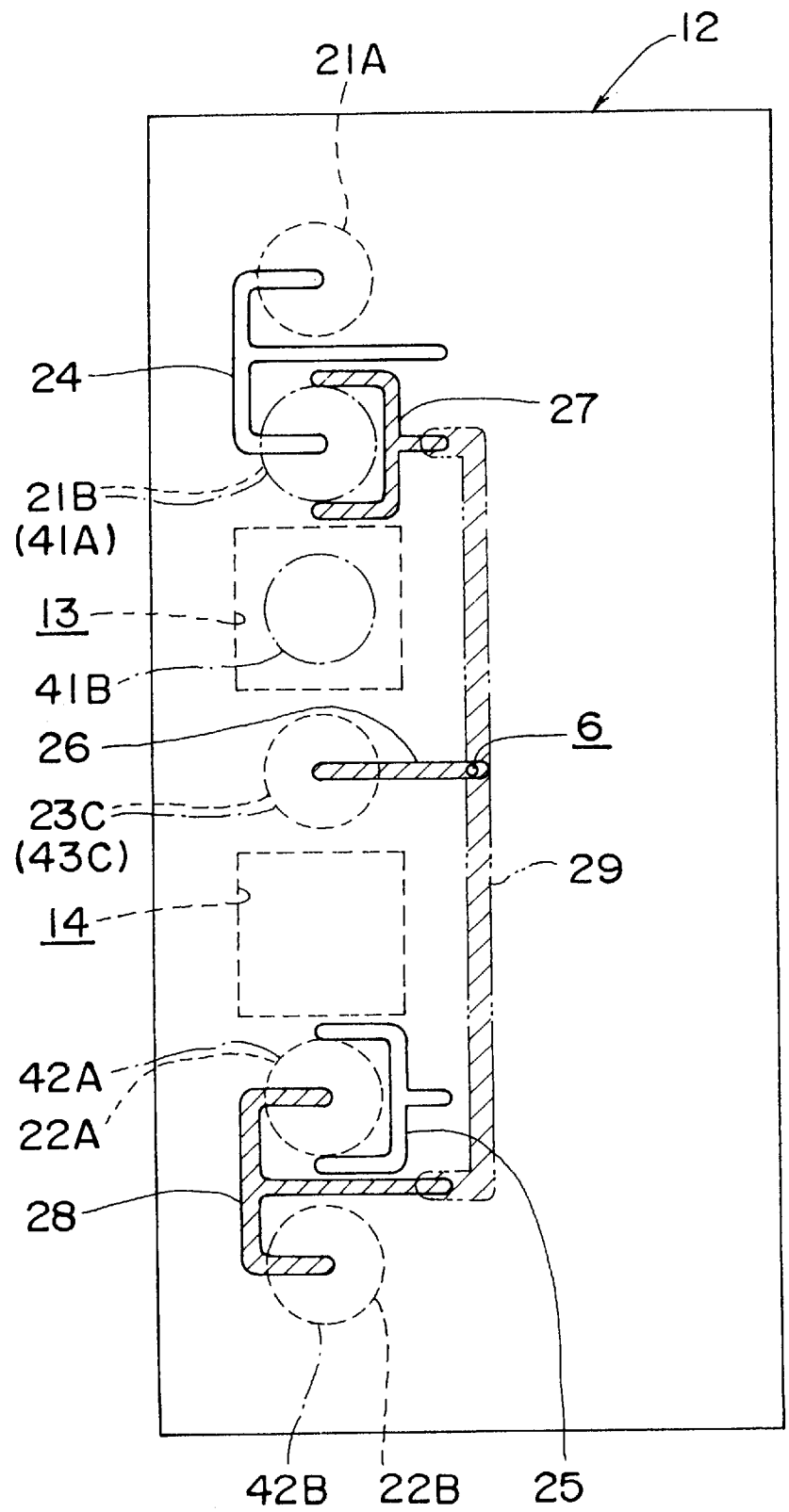
FIG. 5 is a perspective view of the stationary die and the movable die for showing resin passages in the second injection step.

Also, as shown in FIGS. 4 and 5, on a side of the intermediate support plate 12 of the stationary die 1 facing the die plate 10, are provided a first resin passage 24 corresponding to generally central portions of the molding portions 21A, 21B of the first hollow-member use stationary die portion 21, a second resin passage 25 corresponding to a peripheral portion of the female molding portion 22A of the second hollow-member use stationary die portion 22, a common resin passage 26 corresponding to a generally central portion of the molding portion 23C of the intermediate-element use stationary die portion 23, a third resin passage 27 corresponding to a peripheral portion of the female molding portion 21B of the first hollow-member use stationary die portion 21, and a fourth resin passage 28 corresponding to generally central portions of the molding portions 22A, 22B of the second hollow-member use stationary die portion 22.

One end of the common resin passage 26 communicates with a resin supply port 6 which leads to a nozzle hole 5h of the injection head 5 (see FIG. 3) of the injection molding machine that injects molten resin out.

As state before, the stationary die 1 is provided with the switching block 17 for switching over the resin passages to molding portions of the stationary die plate 10. In this switching block 17 is formed a switching resin passage 29 extending vertically.

Then, the switching block 17 is driven vertically by actuating the block-driving cylinder device 16 provided at an upper end of the die plate 10, by which the switching resin passage 29 is moved vertically so that the communicating state between the resin supply port 6 and the resin passages 24–28 is switched over.

Also, although not specifically shown in FIG. 3, ejector plates corresponding to the first and second hollow-member use slidable die portions 41 and 42 and the intermediate-element use movable die portion 43, respectively, are provided between die plate 30 and base plate 31 of the movable die 2, and ejector pins or push-out members for pushing out the finished product W or moving arm 51 is fitted to each ejector plate.

As will be described later, the ejector plates are coupled to, for example, hydraulic driving means (not shown) independent of one another. This driving means is connected to the control panel of the molding apparatus so as to be capable of signal transmission and reception therewith, thus enabled to drive the individual ejector plates at specified timing independently of one another in response to a control signal derived from the control panel.

In addition, the first ejector plate corresponding to the first hollow-member use slidable die portion 41 is denoted by numeral 61 in later-described FIGS. 9 and 10 and FIGS. 14 to 17, and the intermediate ejector plate corresponding to the intermediate-element use movable die portion 43 is denoted by numeral 65 in FIGS. 11 to 13.

Also, the second ejector plate corresponding to the second hollow-member use slidable die portion 42, although not shown in the drawings, has the same constitution and operates in the same way as the first ejector plate 61.

Molding process for an oil strainer W performed with the use of the molding apparatus constructed as described above is explained. In this embodiment, a nylon resin blended with reinforcing glass fiber is used as an example of the material resin for the oil strainer W.

Figure 6:
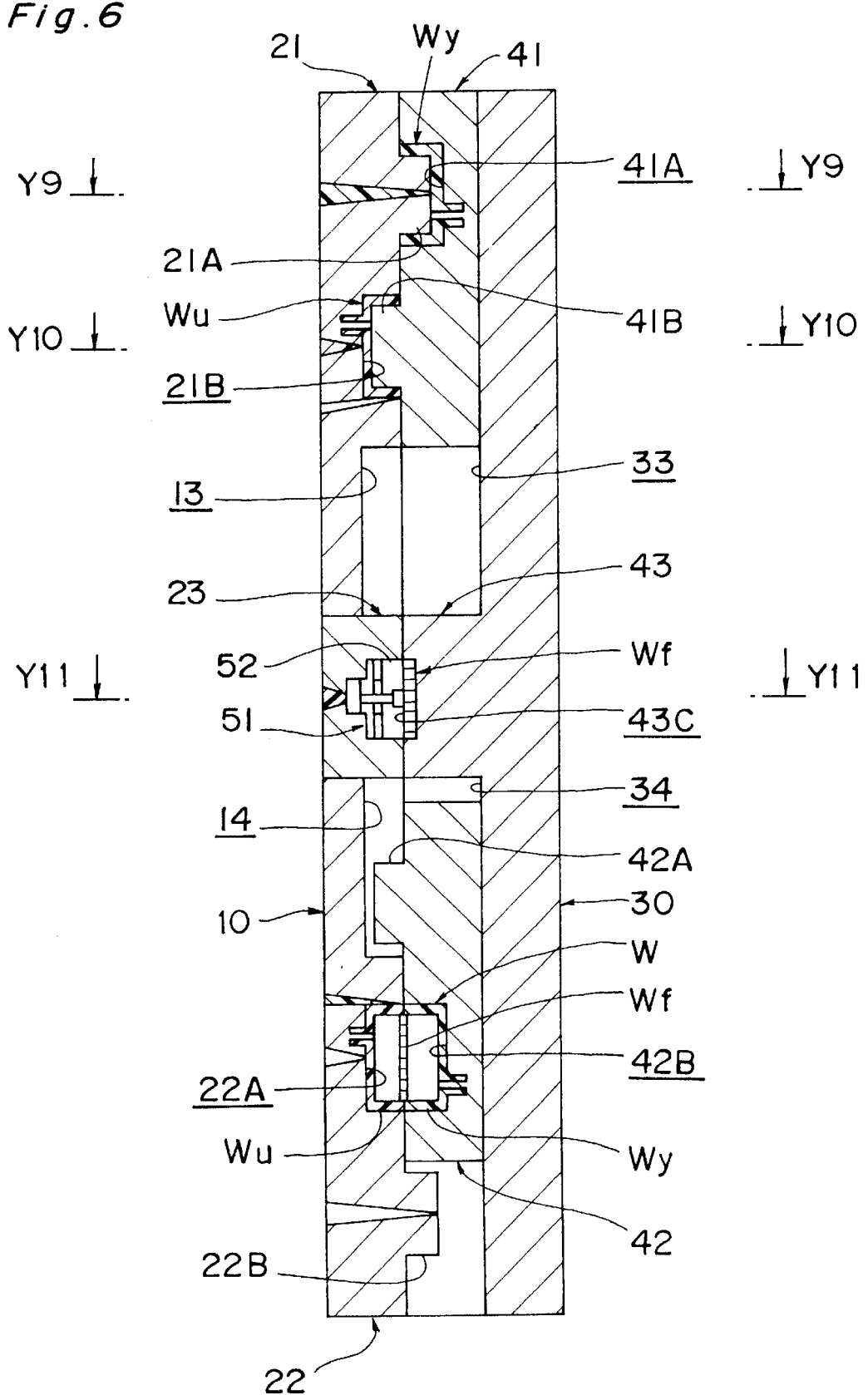
FIG. 6 is an explanatory view in longitudinal cross section showing a first die closure step and a first injection step of a molding apparatus according to the embodiment.
Figure 7:
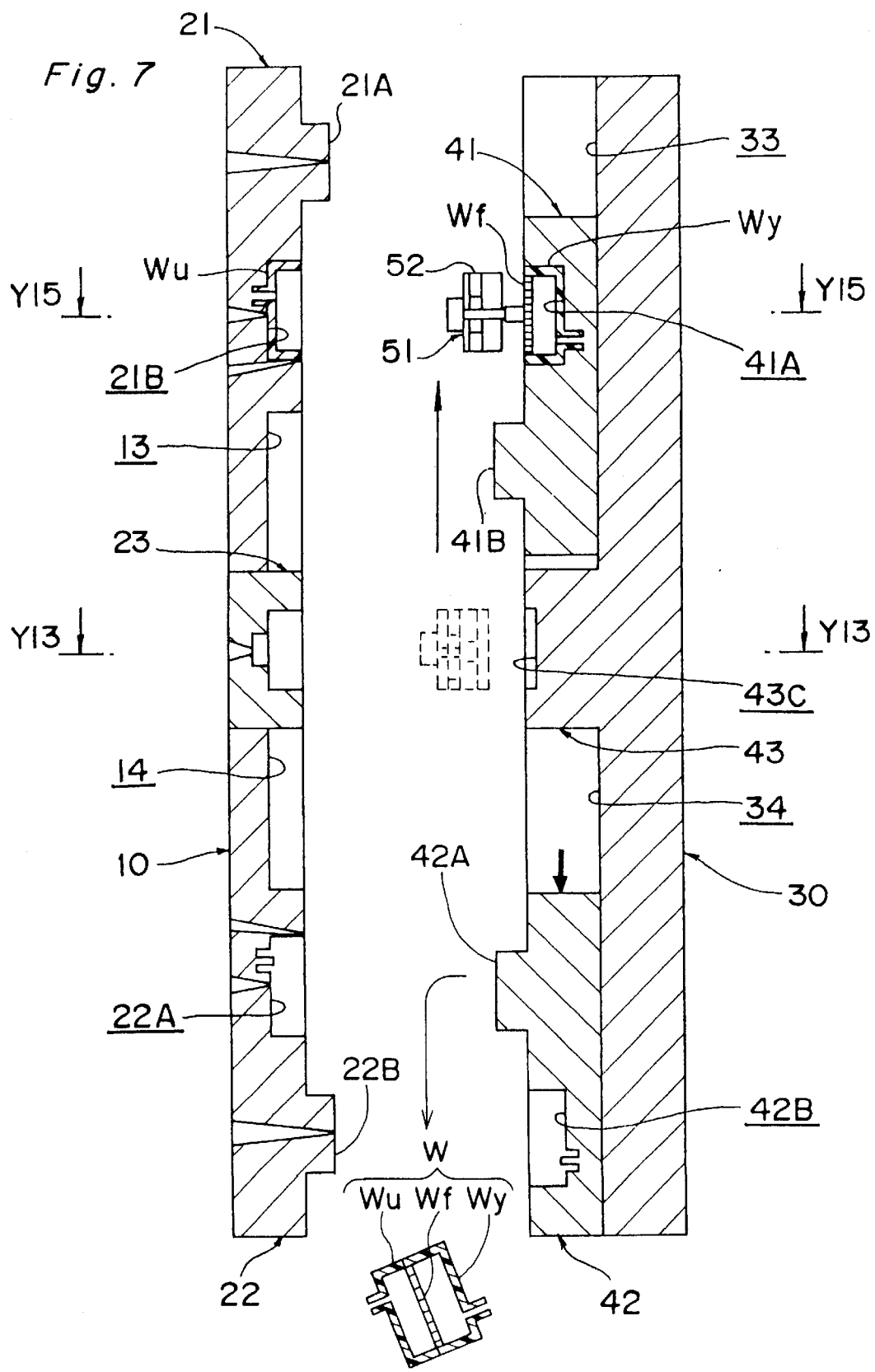
FIG. 7 is an explanatory view in longitudinal cross section showing a first takeout step of the molding apparatus.
Figure 8:
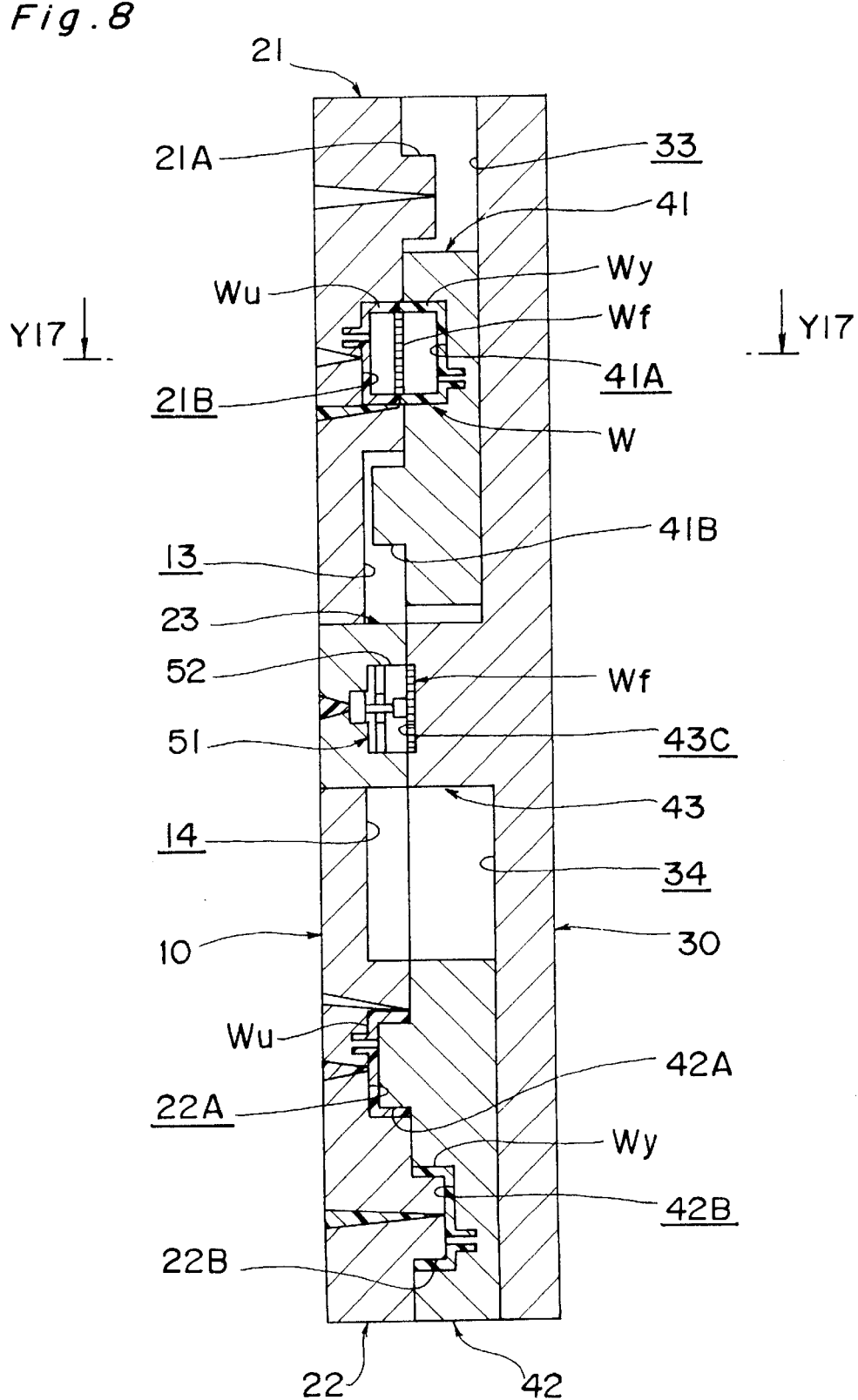
FIG. 8 is an explanatory view in longitudinal cross section showing a second die closure step and a second injection step of the molding apparatus.

FIGS. 6 to 8 are schematic explanatory views in longitudinal cross section of the molding apparatus, showing the sequence of molding steps for the oil strainer W. Also, FIGS. 9 to 17 are schematic explanatory views in transverse cross section of the molding apparatus, showing in detail the molding steps for the oil strainer W, respectively. In FIGS. 6 to 8, the stationary die 1 and the movable die 2 are shown by only the die plates 10 and 30, respectively, for simplicity's sake.

First, while both the first and second hollow-member use slidable die portions 41 and 42 of the die plate 30 of the movable die 2 are set in the upper position on the base plate 31 as an initial state as shown in FIGS. 1 and 6, the movable die 2 is closed to the stationary die 1, by which a die closure is achieved (first die closure step) As a result of this, combinations between the molding portions of the two molding dies 1, 2 become as follows, where the following molding cavities are obtained, respectively, as listed in descending order from the top of FIG. 6:

female molding portion 41A of first hollow-member use slidable die portion 41
      male molding portion 21A of first hollow-member use stationary die portion 21
        molding cavity corresponding to lower half Wy male molding portion 41B of first hollow-member use slidable die portion 41
      female molding portion 21B of first hollow-member use stationary die portion 21
        molding cavity corresponding to upper half Wu female molding portion 43C of intermediate-element use movable die portion 43
      molding portion 23C of intermediate-element use stationary die portion 23
        molding cavity corresponding to intermediate element Wf (filter)

female molding portion 42B of second hollow-member use slidable die portion 42
      female molding portion 22A of second hollow-member use stationary die portion 22
        cavity corresponding to a combination of upper and lower halves Wu, Wy In this first die closure step, the male molding portion 42A of the second hollow-member use slidable die portion 42 is positioned on standby within the second recessed portion 14 of the stationary die plate 10 and does not form any molding cavity.

Also, the molding cavity corresponding to the intermediate element Wf (filter) is, more specifically, defined by the female molding portion 43C of the intermediate-element use movable die portion 43, the male molding portion 23C of the intermediate-element use stationary die portion 23 and a die piece (denoted by numeral 44 in later-described FIGS. 11 to 15) which is clamped by the holder portion 52 of the moving arm 51 and which, preferably, substantially forms part of the holder portion 52 as will be described later.

In this first die closure step, the resin-passage switching block 17 is positioned upward so that the first resin passage 24 and the second resin passage 25 communicate with the resin supply port 6 via the switching resin passage 29 as hatched in FIG. 4. In addition, the common resin passage 26 normally communicates with the resin supply port 6.

Then, in this state, by molten resin being injected from the injection head 5 (first injection step), the lower half Wy, the upper half Wu, the filter Wf and the finished product W, as mentioned in descending order from to top in FIG. 6, are obtained.

Figure 9:
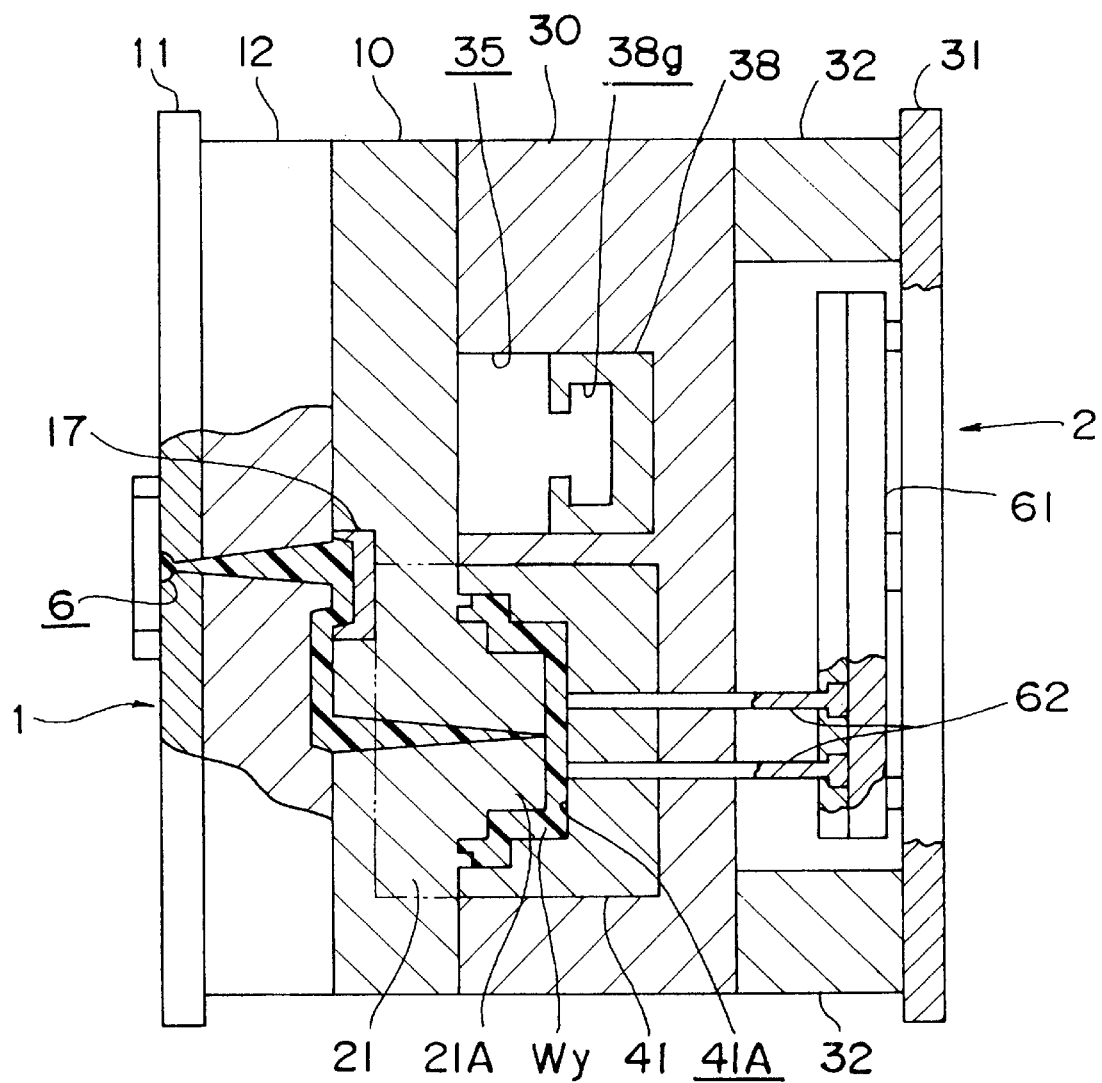
FIG. 9 is an explanatory view in transverse cross section of the molding apparatus taken along a line Y9—Y9 of FIG. 6.
Figure 10:
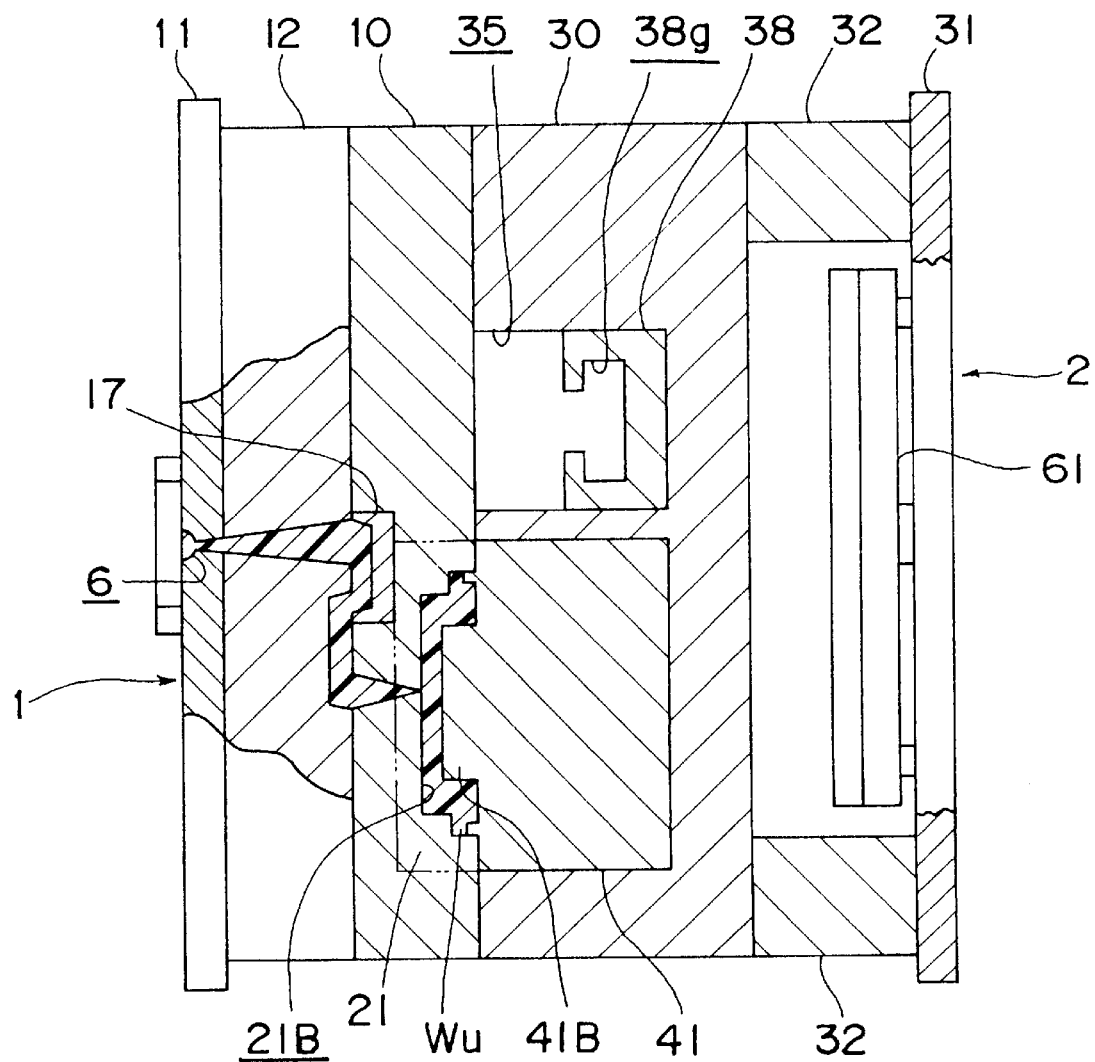
FIG. 10 is an explanatory view in transverse cross section of the molding apparatus taken along a line Y10—Y10 of FIG. 6.

More specifically, the lower half Wy is molded in the molding cavity defined by the female molding portion 41A of the first hollow-member use slidable die portion 41 and the male molding portion 21A of the first hollow-member use stationary die portion 21 as shown in detail in FIG. 9 (first injection molding), and the upper half Wu is molded in the molding cavity defined by the male molding portion 41B of the first hollow-member use slidable die portion 41 and the female molding portion 21B of the first hollow-member use stationary die portion 21 as shown in detail in FIG. 10 (first injection molding).

Also, the intermediate element Wf (filter) is molded in the molding cavity defined by the female molding portion 43C of the intermediate-element use movable die portion 43, the male molding portion 23C of the intermediate-element use stationary die portion 23 and the below-described die piece 44 as shown in detail in FIG. 11.

Figure 11:
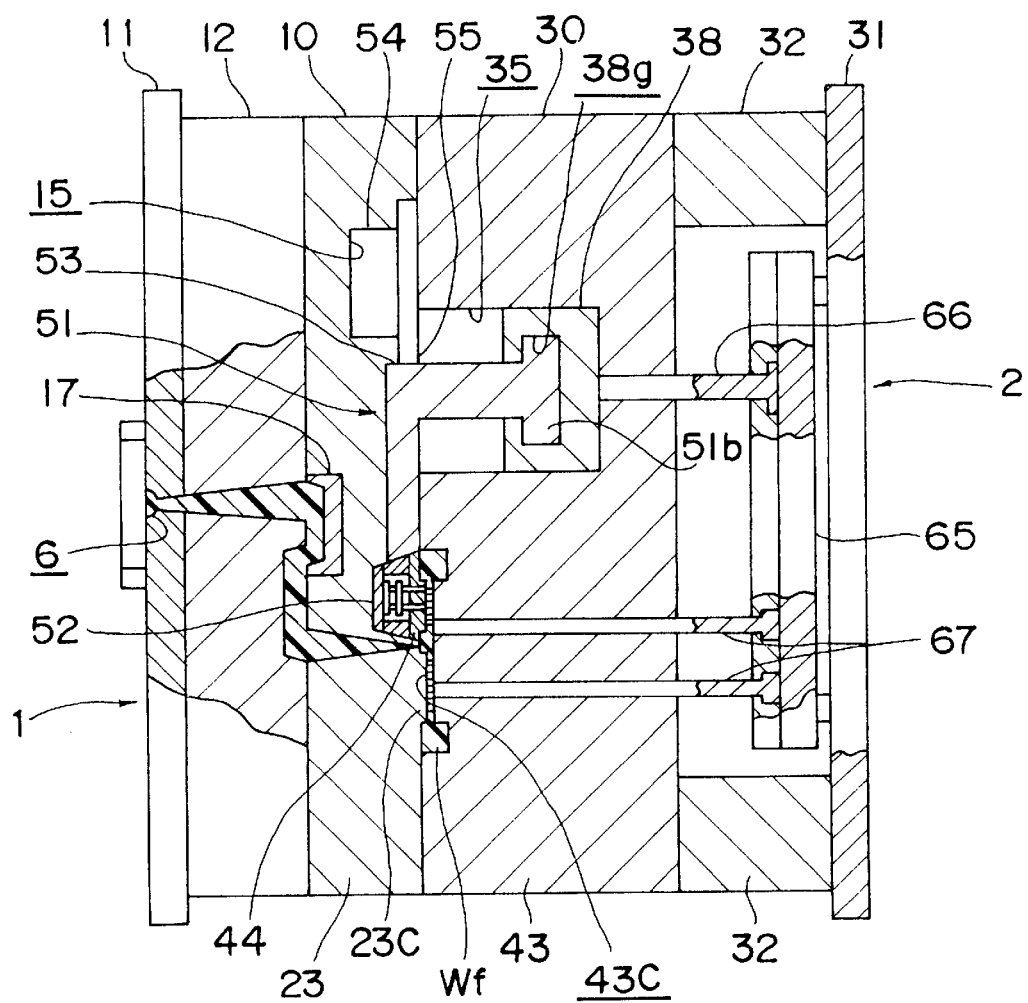
FIG. 11 is an explanatory view in transverse cross section of the molding apparatus taken along a line Y11—Y11 of FIG. 6.

As can be well understood from FIG. 11, a longitudinally extending slide rail 38 is accommodated within the third recessed portion 35 of the movable die plate 30, and the base portion 51*b* of the moving arm 51 as the intermediate-element moving mechanism for moving the molded filter Wf up to a specified position along the longitudinal direction of the die plate 30 is slidably fitted into a rail groove 38*g* of the slide rail 38.

Then, as described before, by the servo motor 54 being driven, the pinion 55 is rotated, causing the moving arm 51 to move longitudinally of the die plate 30 along the third recessed portion 35 via the rack 53.

Also, as can be understood from FIG. 11, the molding cavity for molding the intermediate element Wf (filter) is defined by the female molding portion 43C of the intermediate-element use movable die portion 43, the male molding portion 23C of the intermediate-element use stationary die portion 23 and the die piece 44 as described above.

This die piece 44, when combined with the male molding portion 23C having a shape close to a semicircular pillar shape as described before, forms a perfectly circular pillar (male molding portion), serving as the remaining generally semicircular pillar. The die piece 44 forming part of the die structure in this way is attached to the holder portion 52 of the moving arm 51, and moves together with the moving arm.

The molded filter Wf is clamped by the holder portion 52 via the die piece 44. For example, by giving a certain surface roughness to side face portions of molding faces of the die piece 44, frictional force that occurs between contact surfaces of the filter Wf and the die piece 44 upon a separation of the molded filter Wf from the die piece 44 can be increased so that the filter Wf can be prevented from improvidently separating from the die piece 44. In other words, the filter Wf is clamped by the holder portion 52 via the die piece 44 so as not to separate off improvidently. The filter Wf clamped like this can be easily separated from the die by an advancing (pushing out) operation of the push-out pin provided within the holder portion 52. Accordingly, it can be said that, in this case, the die piece 44 preferably forms part of the holder portion 52.

In addition, the technique for clamping the filter Wf by the holder portion 52 is not limited to the above example, and other various known techniques are applicable such as sucking up the molded filter by reducing the internal pressure of the holder.

The slide rail 38 can be moved to a specified extent forward of the die plate 30 along the side wall of the third recessed portion 35 by a push-out operation of a push-out member 66 coupled to the intermediate ejector plate 65 disposed between die plate 30 and base plate 31 of the movable die 2. Also, the moving arm 51 is returned to a generally center (initial position) in the longitudinal direction (vertical direction) of the movable die plate 30 for die closure as described before, so that, with the stationary die 1 and the movable die 2 closed together, the arm portion 51a, the rack 53 and the servo motor 54 are accommodated within the third recessed portion 15 provided in the stationary die plate 10.

The intermediate ejector plate 65 is coupled to, for example, hydraulic driving means as described above. This driving means is connected to the control panel of the molding apparatus so as to be capable of signal transmission and reception therewith, thus enabled to drive the intermediate ejector plate 65 at specified timing in response to a control signal derived from the control panel.

Meanwhile, the lower half Wy held in the female molding portion 42B of the second hollow-member use slidable die portion 42, with the filter Wf set to the lower half Wy, and the upper half Wu held in the female molding portion 22A of the second hollow-member use stationary die portion 22 are combined together in the cavity portion in which the female molding portion 42B of the second hollow-member use slidable die portion 42 and the female molding portion 22A of the second hollow-member use stationary die portion 22 are combined together.

With respect to this combination, by injecting molten resin into the groove portion Wg (see FIG. 2) on the peripheries of the two halves Wu, Wy (secondary injection), the two halves Wu, Wy are joined together, by which the finished product W is obtained.

In addition, both of these halves Wu, Wy in this cavity have been molded in the preceding cycle, and the state in which molten resin is injected and charged into the groove portion Wg on the peripheries of the two halves Wu, Wy so that the halves Wu, Wy are joined together is similar to a later-described state shown in FIG. 17.

At a startup of production, since there is no molded article of the preceding cycle in the case of the first-time secondary injection step, a dummy having the same shape as an article in which the upper half Wu and the lower half Wy are brought into abutment against each other is set before the injection and charging of molten resin (secondary resin) is performed.

Next, as shown in FIG. 7, the movable die 2 is withdrawn while kept parallel to the stationary die 1, by which a die opening is achieved, where the finished product W obtained by the above first injection step is taken out (first takeout step). In addition, as will be described later more specifically, on this movable die 2 side, an ejector mechanism for pushing out the finished product W from the female molding portion 41A or 42B at the die opening is provided for taking out the completed finished product W.

Also, after the movable die 2 is opened, the die plate 10 of the stationary die 1 is separated off while kept parallel to the intermediate support plate 12, and excess resin (a useless resin mass) corresponding to the resin passage in the first injection step is removed (e.g., see later-described FIGS. 13 and 14). This separating and abutting operation of the die plate 10 to the intermediate support plate 12 is, although not specifically shown, carried out by a die-pushing-out cylinder provided in the intermediate support plate 12.

After that, by actuating the first and second slidable-die-portion driving cylinders 36, 37, the first and second hollow-member use slidable die portions 41 and 42 are slid along the longitudinal direction of the movable die plate 30 (i.e., along the first and second recessed portions 33 and 34) so as to be moved downward (a direction reverse to that of the preceding cycle) to specified pitches, respectively, as shown in FIG. 7 (first sliding step).

It is to be noted that, as described above, the sliding extents of the hollow-member use slidable die portions 41 and 42 are equal to distances between molding portions of the hollow-member use slidable die portions 41 and 42 (i.e., distances between molding portions of their corresponding hollow-member use stationary die portions 21 and 22), respectively. The intermediate-element use movable die portion 43 is stationary relative to the movable die plate 30.

Figure 12:
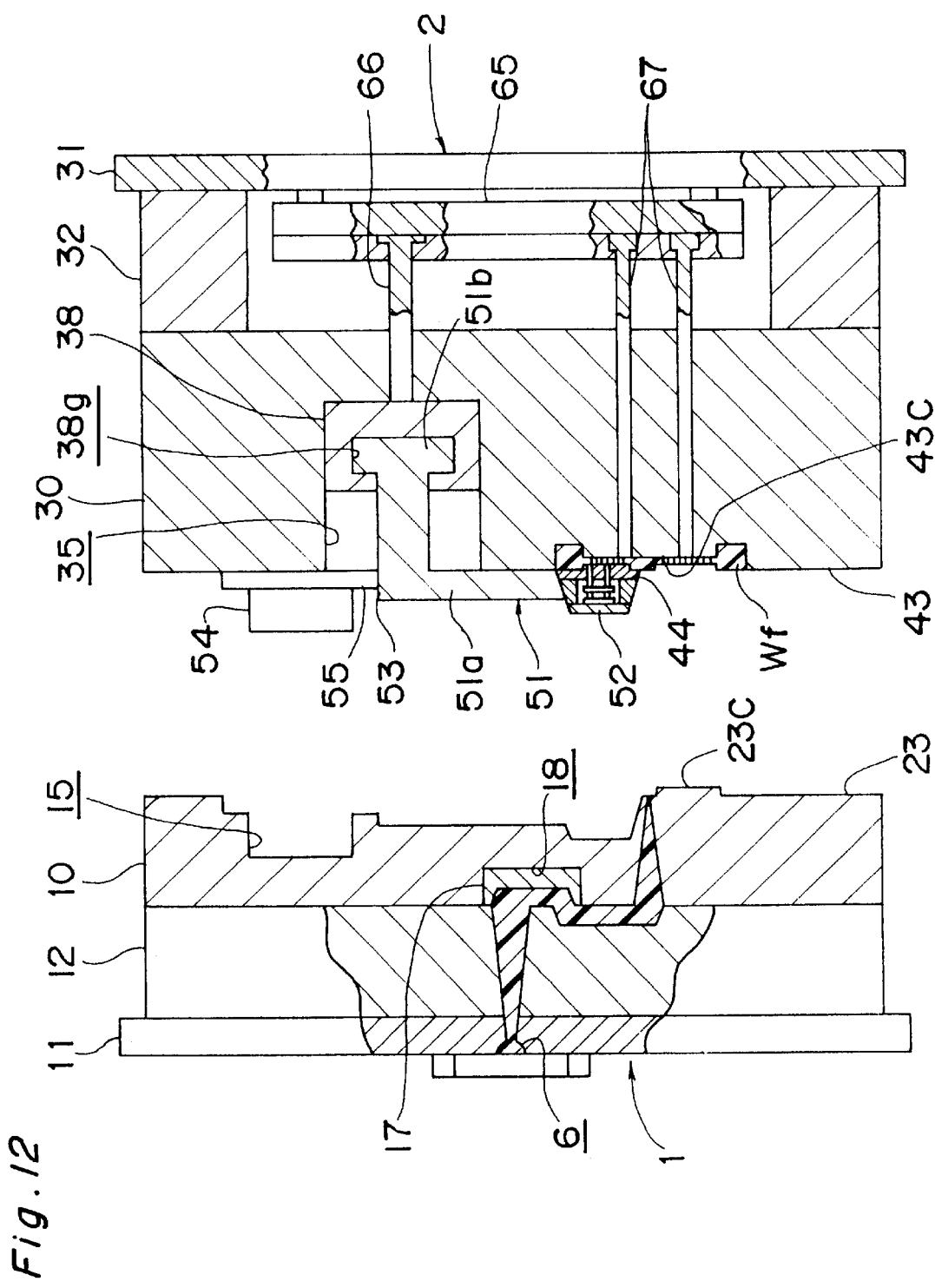
FIG. 12 is an explanatory view in transverse cross section of the molding apparatus for showing a filter clamping state by a moving arm of the molding apparatus.

Next, by driving the holder portion 52 of the moving arm 51 according to a control signal derived from the control panel (not shown), the molded filter Wf is clamped by the holder portion 52 as shown in FIG. 12. When this is done, the filter Wf is clamped together with the die piece 44 that forms part of the molding die.

Figure 13:
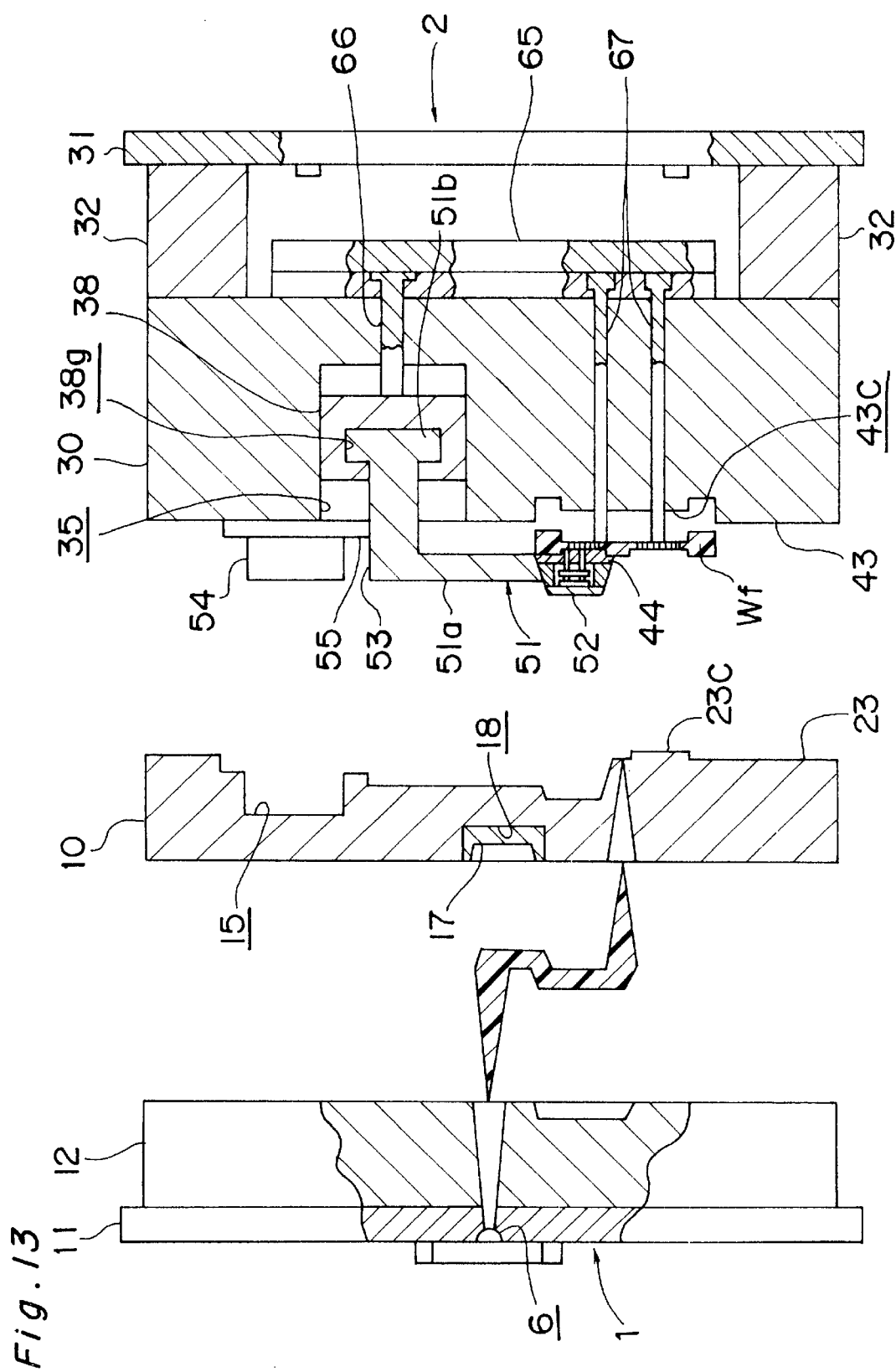
FIG. 13 is an explanatory view in transverse cross section of the molding apparatus taken along a line Y13—Y13 of FIG. 7.

Subsequently, as shown in FIG. 13, the intermediate ejector plate 65 is driven, causing the push-out member 66 to advance, by which the moving arm 51 is pushed out to a specified extent via the slide rail 38 while the intermediate ejector pin 67 is advanced so that the molded filter Wf is pushed out to a specified extent.

Then, by the servo motor 54 being actuated, the moving arm 51 is driven and, while clamping the molded filter Wf by the holder portion 52, moved along the slide rail 38 up to a position corresponding to the female molding portion 41A of the first hollow-member use slidable die portion 41 as shown by arrow in solid line in FIG. 7.

Figure 14:
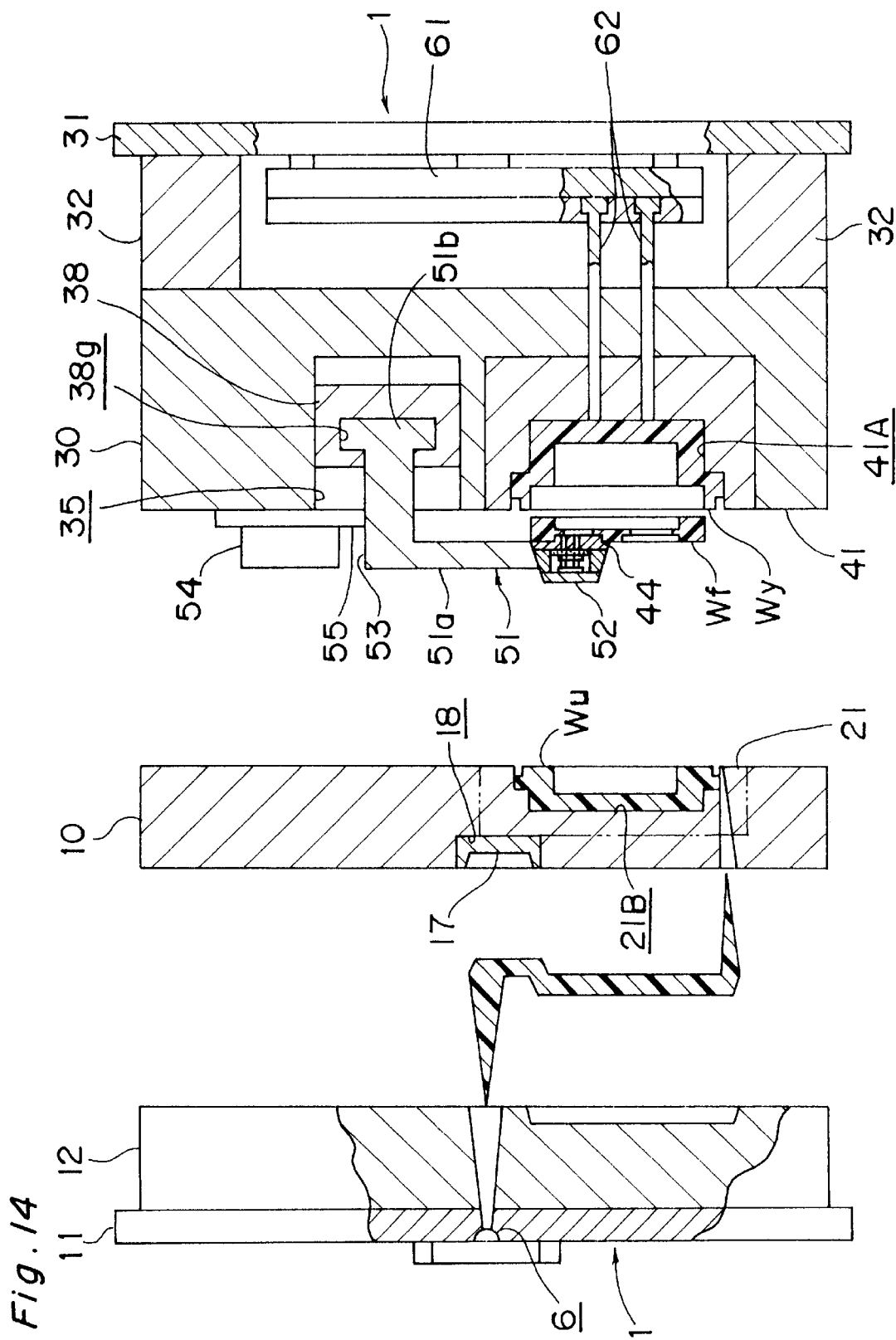
FIG. 14 is an explanatory view in transverse cross section of the molding apparatus showing a state in which the filter has been moved to the assembly position by the moving arm.

At this position, after the filter Wf is correctly positioned relative to the lower half Wy held within the female molding portion 41A of the first hollow-member use slidable die portion 41, the intermediate ejector plate 65 is withdrawn as shown in FIG. 14, and the moving arm 51 is also withdrawn along with the withdrawal of the intermediate ejector plate 65, by which the molded filter Wf is assembled to the lower half Wy as shown in FIG. 15.

After the filter Wf is completely set to the lower half Wy in this way, the clamping state by the holder portion 52 is released and the moving arm 51 is withdrawn to the initial position (center position of the intermediate-element use movable die portion 43).

Figure 16:
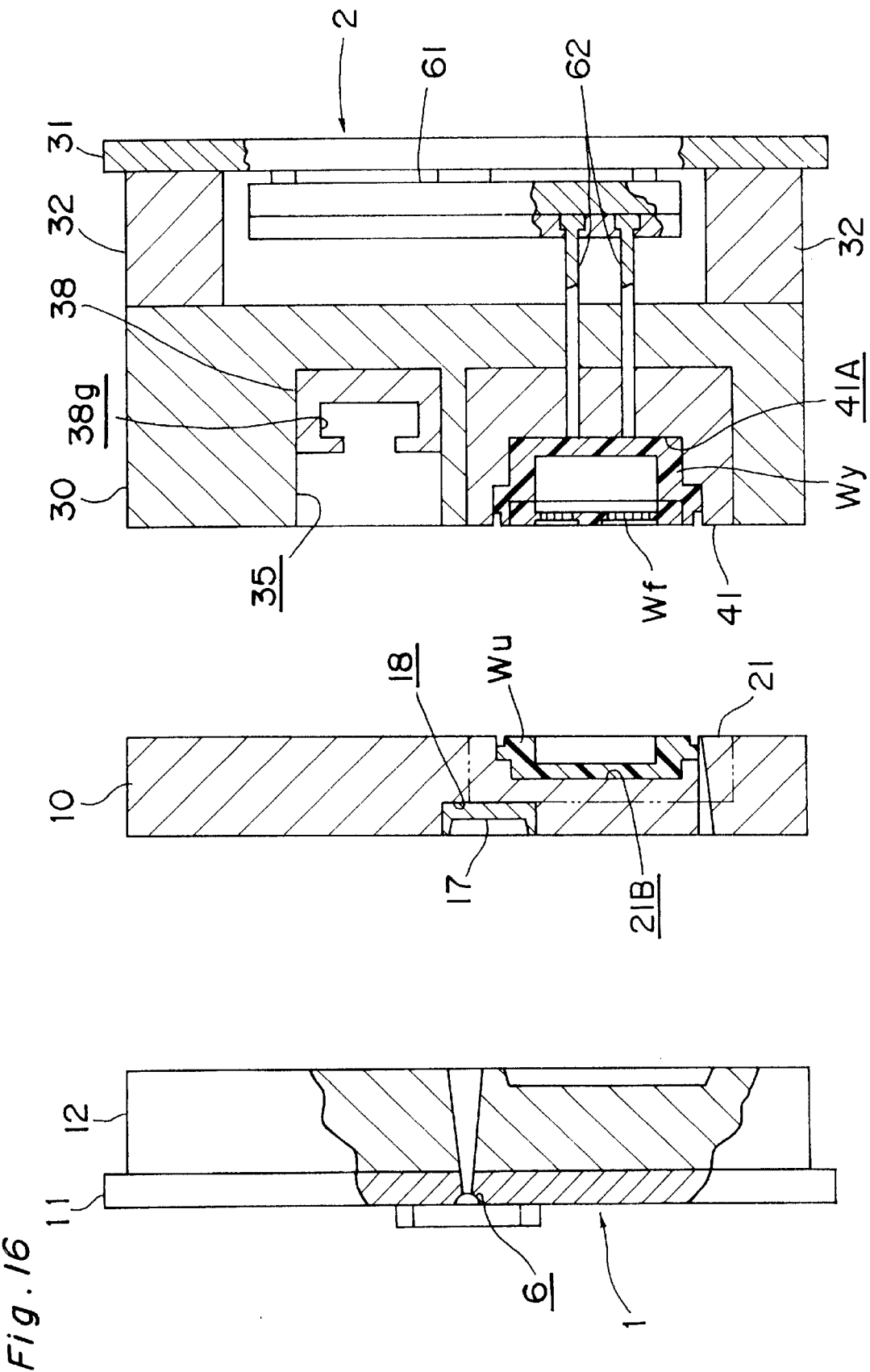
FIG. 16 is an explanatory view in transverse cross section of the molding apparatus showing a set state of the filter to half bodies.

In this state, as shown in FIG. 16, the lower half Wy held in the female molding portion 41A of the first slidable die portion 41, with the filter Wf set to the lower half Wy, and the upper half Wu held in the female molding portion 21B of the first hollow-member use stationary die portion 21 are positioned so as to face each other.

In addition, although the push-out and move of the moving arm 51 is performed after the sliding operation of the first and second hollow-member use slidable die portions 41 and 42 in the above description, these operation steps may be done in the reverse order or may be done concurrently.

After the moving arm 51 is completely withdrawn to the initial position as shown above, the movable die 2 is closed to the stationary die 1, thus achieving die closure as shown in FIG. 8 (second die closure). As a result of this, combinations between the molding portions of the two dies 1, 2 become as follows, where the following molding cavities are obtained, respectively:

female molding portion 41A of first hollow-member use slidable die portion 41
   female molding portion 21B of first hollow-member use stationary die portion 21
      cavity corresponding to a combination of upper and lower halves Wu, Wy
female molding portion 43C of intermediate-element use movable die portion 43
   molding portion 23C of intermediate-element use stationary die portion 23
      molding cavity corresponding to intermediate element Wf (filter)
male molding portion 42A of second hollow-member use slidable die portion 42
   female molding portion 22A of second hollow-member use stationary die portion 22
      molding cavity corresponding to upper half Wu
female molding portion 42B of second hollow-member use slidable die portion 42
   male molding portion 22B of second hollow-member use stationary die portion 22
      molding cavity corresponding to lower half Wy In this second die closure step, the male molding portion 41B of the first hollow-member use slidable die portion 41 is positioned on standby within the first recessed portion 13 of the stationary die plate 10 and does not form any molding cavity.

In this second die closure state, the resin-passage switching block 17 has been switched to the lower position, so that the third resin passage 27 and the fourth resin passage 28 communicate with the resin supply port 6 via the switching resin passage 29 as hatched in FIG. 5. The common resin passage 26 normally communicates with the resin supply port 6.

Then, in this state, by molten resin being injected from the injection head 5 (second injection step), the finished product W, the filter Wf, the upper half Wu and the lower half Wy, as mentioned in descending order from the top in FIG. 8, are obtained.

Figure 17:
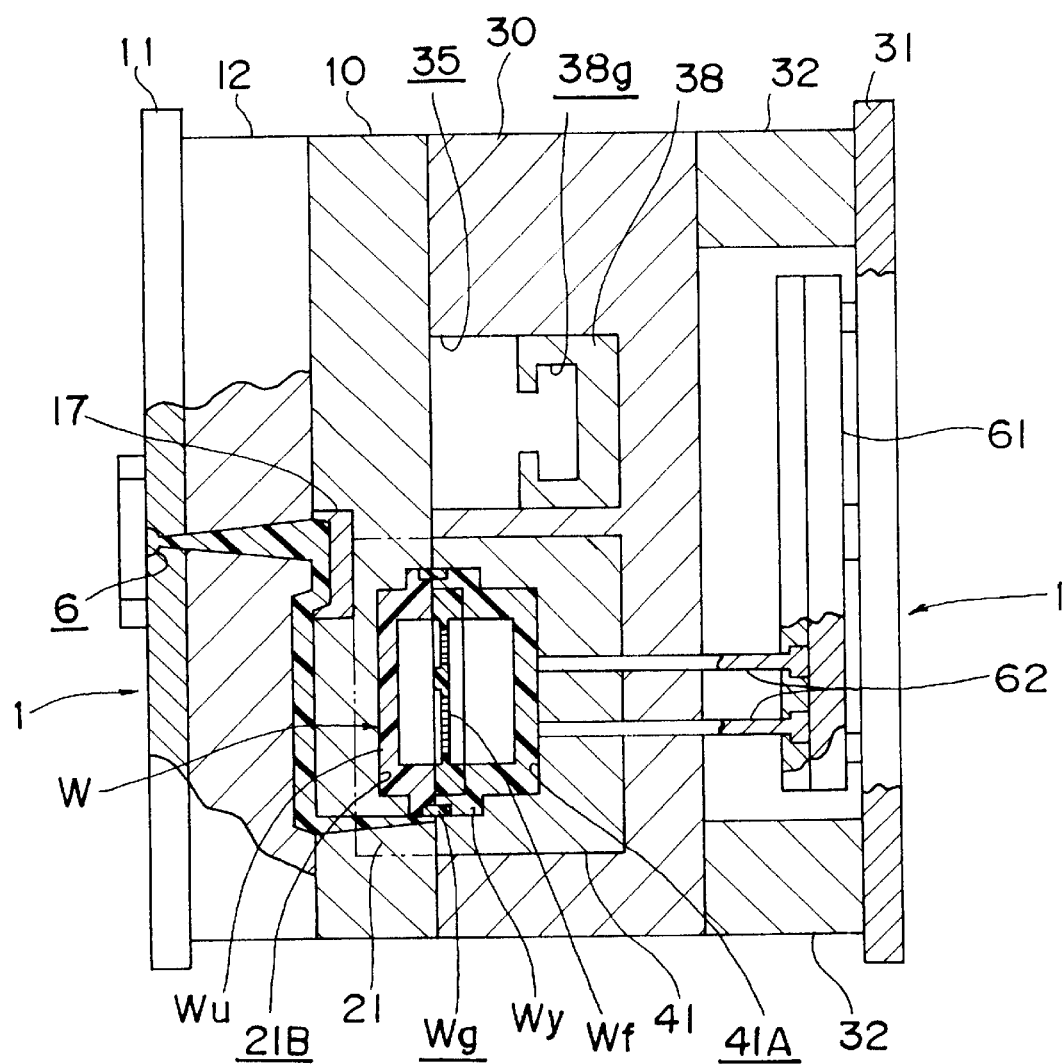
FIG. 17 is an explanatory view in transverse cross section of the molding apparatus taken along a line Y17—Y17 of FIG. 8.

As shown in detail in FIG. 17, the lower half Wy held by the female molding portion 41A of the first hollow-member use slidable die portion 41 with the filter Wf set to the lower half Wy, and the upper half Wu held by the female molding portion 21B of the first hollow-member use stationary die portion 21 are combined together in the cavity portion in which the female molding portion 41A of the first hollow-member use slidable die portion 41 and the female molding portion 21B of the first hollow-member use stationary die portion 21 are combined together. With respect to this combination, by injecting and charging molten resin (secondary resin) into the groove portion Wg on the peripheries of the two halves Wu, Wy (secondary injection), the two halves Wu, Wy are joined together, by which the finished product W is obtained.

In this secondary injection of the second injection step, both of the halves Wu, Wy in the cavity have been molded by the first injection step of the current cycle.

After that, as in the foregoing die opening step, the movable die 2 is withdrawn while kept parallel to the stationary die 1, by which a die opening is achieved, where the finished product W obtained by the above second injection step is taken out (second takeout step).

In this process, the first ejector plate 61 (see FIGS. 14 to 17) is driven, causing the first ejector pin 62 to advance so that the molded article W is pushed out.

By iteratively carrying out the steps shown in FIGS. 6 to 8 in the way described above (where the sliding direction of the hollow-member use slidable die portions 41 and 42 and the moving direction of the moving arm 51 are reversed every time), the synthetic resin-made hollow member (oil strainer W) in which the upper and lower halves Wu, Wy have been joined to each other can be obtained one by one at each one-time opening and closing operation of the movable die 2.

As described hereinabove, according to this embodiment, at each one-time opening and closing operation of the movable die 2 to the stationary die 1, the hollow member (oil strainer W) in which the upper and lower halves Wu, Wy have been joined to each other with the intermediate element (synthetic resin-made filter Wf) previously incorporated between the two halves Wu, Wy can be obtained.

In this case, since the step of fabricating the intermediate element Wf can be performed as a sequence of steps together with the molding step and the abutting and joining step of the halves Wu, Wy, it is no longer necessary to separately manage the intermediate element as a component part as would be done in the prior art. Further, since the intermediate element Wf and the halves Wu, Wy are generally similar in molding conditions and assembling temperature condition to each other, it becomes possible to improve the assemblability and the assembly precision.

Also, by virtue of the provision of the moving arm 51 as intermediate-element moving mechanism for moving the molded intermediate element Wf longitudinally up to a specified position, the intermediate element Wf can be automatically assembled to a half body Wu or Wy, allowing not only the improvement in assembly precision but also saving of labor and improvement in production efficiency to be achieved.

Further, by virtue of the provision of the moving arm 51 in the molding die, the travel of the intermediate element Wf can be shortened, as compared with the case where an automatic assembler provided outside the molding apparatus is used, so that the assembly precision of the intermediate element Wf to the half body Wu or Wy can be further enhanced and besides that the production cycle time can be further reduced.

In particular, according to this embodiment, since the moving arm 51 is moved with the initial position set to an intermediate position (intermediate-element use movable die portion 43) between the first and second hollow-member use slidable die portions 41 and 42, the travel of the moving arm 51 required to move the intermediate element Wf can be even more shortened so that the assembly precision can be even more improved and that the production cycle time can be even further reduced.

Also, in particular, since the intermediate element Wf, when clamped by the holder portion 52 of the moving arm 51, is clamped together with the die piece 44 that forms part of the molding die portion for the intermediate element Wf, the clamping precision for the clamping of the intermediate element can be further enhanced so that the assembly precision to the halves Wu, Wy can be even further improved.

In addition, although this embodiment has been given as one concerning an oil strainer, the present invention is not limited to such a case and can be effectively applied to other types of synthetic resin-made hollow members with an intermediate element incorporated between a pair of synthetic resin-made half bodies, as well.

Moreover, needless to say, the present invention is not limited to the above embodiments, and various modifications and design changes may be made without departing the gist of the invention.

For example, the moving arm 51 may be provided not on the movable die 2 side but on the stationary die 1 side. It is also possible that the order of the male and female molding portions provided in the first and second hollow-member use stationary die portions 21 and 22 is reversed while the order of the male and female molding portions provided in the first and second hollow-member use slidable die portions 41 and 42 is reversed. In this case, since the female molding portions become closer to the longitudinal centers of the die plates, respectively, the travel of the moving arm 51 can be even further shortened.

What is claimed is:

1. A method for manufacturing a synthetic resin-made hollow member with an intermediate element incorporated therein by, with the intermediate element placed between a pair of synthetic resin-made half bodies, bringing the half bodies into abutment against each other and joining the half bodies together at this abutted portion, the method comprising:

with use of a molding apparatus for slide injection molding, the molding apparatus comprising: a stationary molding die having first and second hollow-member use stationary die portions in each of which a male molding portion and a female molding portion spaced from each other at a specified spacing are arrayed longitudinally, and a stationary-side intermediate-element use die portion placed between the two hollow-member use stationary die portions and having an intermediate-element molding portion; a movable molding die having first and second hollow-member use slidable die portions in each of which a male molding portion and a female molding portion spaced from each other at a specified spacing are arrayed longitudinally in an order reverse to that of the hollow-member use stationary die portions, and a movable-side intermediate-element use die portion placed between the two hollow-member use slidable die portions and having an intermediate-element molding portion; and intermediate-element moving mechanism for moving an intermediate element molded by a combination of the stationary-side and movable-side intermediate-element use molding portions longitudinally up to a specified position, wherein the stationary and movable molding dies are openable and closable to each other and the first and second hollow-member use slidable die portions are slidable longitudinally at specified pitches, respectively, relative to the first and second hollow-member use stationary die portions, respectively, while the movable-side intermediate-element use die portion is non-slidable relative to the stationary-side intermediate-element use die portion, a die closure step for performing die closure by closing the stationary molding die and the movable molding die to each other;

an injection step for, after the die closure step, injecting molten resin into a molding cavity defined by the two molding dies so that first and second half bodies for a current cycle are molded by combinations of the male molding portions and the female molding portions and that an intermediate element for the current cycle is molded by a combination of the intermediate-element molding portions, and further joining the first and second half bodies of a preceding cycle by injecting molten resin to an abutted portion between the first and second half bodies by a combination of the female molding portions;

a takeout step for, after the injection step, taking out a hollow member, in which the half bodies of the preceding cycle have been joined to each other with the intermediate element of the preceding cycle previously incorporated therein, while opening the molding dies; an intermediate-element assembly step for assembling the intermediate element for the current cycle to either one of the first and second half bodies for the current cycle by driving the intermediate-element moving mechanism and thereby moving the intermediate element; and a sliding step for sliding the first and second hollow-member use slidable die portions to specified pitches, respectively, longitudinally in a direction reverse to that of the preceding cycle, these steps being iteratively performed, whereby a hollow member in which the first and second half bodies have been joined to each other with the intermediate element previously incorporated between the two half bodies is obtained at each one-time opening and closing operation of the stationary molding die and the movable molding die, wherein the injection step is conducted by injecting molten resin from only one injections means, the intermediate-element moving mechanism is in the molding die, the intermediate-element moving mechanism has a holder portion which includes a die piece, the intermediate element is molded by a combination of the stationary-side and movable-side intermediate-element use molding portions and the die piece included in the holder portion of the intermediate element moving mechanism in the injection step and the intermediate element is clamped by the holder portion via the die piece and moved in the intermediate-element assembly step.

2. The method for manufacturing a synthetic resin-made hollow member according to claim 1, wherein an initial position of the intermediate-element moving mechanism for moving the intermediate element is set to the stationary-side or movable-side intermediate-element use die portion.

3. An apparatus for manufacturing a synthetic resin-made hollow member with an intermediate element incorporated therein by, with the intermediate element placed between a pair of synthetic resin-made half bodies, bringing the half bodies into abutment against each other and joining the half bodies together at this abutted portion, the apparatus comprising:

first and second hollow-member use stationary die portions in each of which a male molding portion and a female molding portion spaced from each other at a specified spacing are arrayed longitudinally;

a stationary-side intermediate-element use die portion placed between the two hollow-member use stationary die portions and having an intermediate-element molding portion;

first and second hollow-member use slidable die portions in each of which a male molding portion and a female molding portion spaced from each other at a specified spacing are arrayed longitudinally in an order reverse to that of the hollow-member use stationary die portions;

a movable-side intermediate-element use die portion placed between the two hollow-member use slidable die portions and having an intermediate-element molding portion;

opening and closing mechanism for opening and closing a movable molding die having the first and second hollow-member use slidable die portions and the movable-side intermediate-element use die portion, relative to a stationary molding die having the first and second hollow-member use stationary die portions and the stationary-side intermediate-element use die portion;

sliding mechanism for, while holding the movable-side intermediate-element use die portion non-slidable, sliding the two hollow-member use slidable die portions longitudinally at specified pitches, respectively, relative to their corresponding hollow-member use stationary die portions;

intermediate-element moving mechanism for moving an intermediate element molded by a combination of the stationary-side and movable-side intermediate-element use molding portions longitudinally up to a specified position; and injection mechanism for injecting molten resin into a molding cavity defined by closing the stationary molding die and the movable molding die to each other;

wherein the apparatus performs an injection molding process in which for each one-time opening and closing operation of the stationary molding die and the movable molding die, the hollow-member use slidable die portions slide at specified pitches, respectively, relative to their corresponding hollow-member use stationary die portions while the intermediate-element moving mechanism moves the molded intermediate element to a specified position, so that first and second half bodies for a current cycle are molded by combinations between male molding portions and female molding portions of the first hollow-member use stationary die portion and the first hollow-member use slidable die portion, and that an intermediate element for the current cycle is molded by a combination of the intermediate-element molding portions of the stationary-side and movable-side intermediate-element use die portions, and further that the first and second half bodies of the preceding cycle are joined together by injecting molten resin into an abutted portion between the first and second half bodies by a combination between the female molding portions of the second hollow-member use stationary die portion and the second hollow-member use slidable die portion, whereby a hollow member in which the first and second half bodies have been joined to each other with the intermediate element previously incorporated between the half bodies is obtained at each one-time opening and closing operation of the stationary molding die and the movable molding die, wherein the injection step is conducted by injecting molten resin from only one injections means, the intermediate-element moving mechanism is in the molding die, the intermediate-element moving mechanism has a holder portion which includes a die piece, the intermediate element is molded by a combination of the stationary-side and movable-side intermediate-element use molding portions and the die piece included in the holder portion of the intermediate element moving mechanism in the injection step and the intermediate element is clamped by the holder portion via the die piece and moved in the intermediate-element assembly step.

4. The apparatus for manufacturing a synthetic resin-made hollow member according to claim 3, wherein an initial position of the intermediate-element moving mechanism for moving the intermediate element is set to the stationary-side or movable-side intermediate-element use die portion.

* * * * *